US006540306B2

(12) United States Patent
Kanehisa

(10) Patent No.: US 6,540,306 B2
(45) Date of Patent: Apr. 1, 2003

(54) BICYCLE DISC BRAKE HUB

(75) Inventor: Takanori Kanehisa, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/894,875

(22) Filed: Jun. 29, 2001

(65) Prior Publication Data

US 2003/0000779 A1 Jan. 2, 2003

(51) Int. Cl.[7] .................................................. B60B 1/02
(52) U.S. Cl. ......................... 301/59; 301/110.5; 188/26
(58) Field of Search ............................. 301/74, 76, 56, 301/59, 110.5; 188/26

(56) References Cited

U.S. PATENT DOCUMENTS

| | | | | |
|---|---|---|---|---|
| 1,975,221 A | * 10/1934 | Booth | | 301/110.5 |
| 4,634,189 A | * 1/1987 | LeBlond et al. | | 301/110.5 |
| 5,487,592 A | * 1/1996 | Rasmussen | | 301/55 |
| 5,489,147 A | * 2/1996 | Borsai | | 301/56 |
| 5,626,401 A | * 5/1997 | Terry et al. | | 301/104 |
| 5,647,643 A | * 7/1997 | Noble | | 301/110.5 |
| 5,795,036 A | * 8/1998 | Campagnolo | | 301/59 |
| 5,950,772 A | 9/1999 | Buckley et al. | | |
| 6,010,197 A | * 1/2000 | Crosnier et al. | | 301/110.5 |
| 6,145,938 A | * 11/2000 | Dietrich | | 301/110.5 |
| 6,318,810 B1 | * 11/2001 | Miyake et al. | | 188/218 XL |
| 6,336,531 B1 | * 1/2002 | Chou | | 188/18 A |
| 6,354,669 B1 | * 3/2002 | Tabe | | 301/110.5 |
| 6,409,282 B1 | * 6/2002 | Nakajima et al. | | 301/110.5 |
| 6,428,113 B2 | * 8/2002 | Dietrich | | 301/59 |
| 6,431,657 B2 | * 8/2002 | Tabe | | 301/6.9 |
| 6,431,658 B1 | * 8/2002 | Nakajima et al. | | 301/59 |

FOREIGN PATENT DOCUMENTS

| | | |
|---|---|---|
| DE | 199 15 714 A1 | 10/2000 |
| DE | 199 26 641 A1 | 12/2000 |
| EP | 1 122 096 A2 | 8/2001 |

* cited by examiner

*Primary Examiner*—Jack Lavinder
*Assistant Examiner*—Benjamin A Pezzlo
(74) *Attorney, Agent, or Firm*—Shinjyu Global IP Counselors, LLP

(57) ABSTRACT

A bicycle disc brake hub is provided with a hub axle, a hub shell, a first spoke attachment portion, a second spoke attachment portion and a brake rotor attachment portion disposed adjacent the first spoke attachment portion. The first spoke attachment portion has a plurality of first spoke holes, while the second spoke attachment portion has a plurality of second spoke holes. The first spoke attachment portion is disposed at the first hub shell end, while the second spoke attachment portion is disposed at the second hub shell end. The brake rotor attachment portion has a plurality of axially extending rotor mounting holes with predetermined diameters and center axes spaced a second radial distance from the center axis of the hub axle. The first spoke attachment portion and the brake rotor attachment portion are arranged relative to each other such that spokes can easily be installed into the first spoke holes.

71 Claims, 17 Drawing Sheets

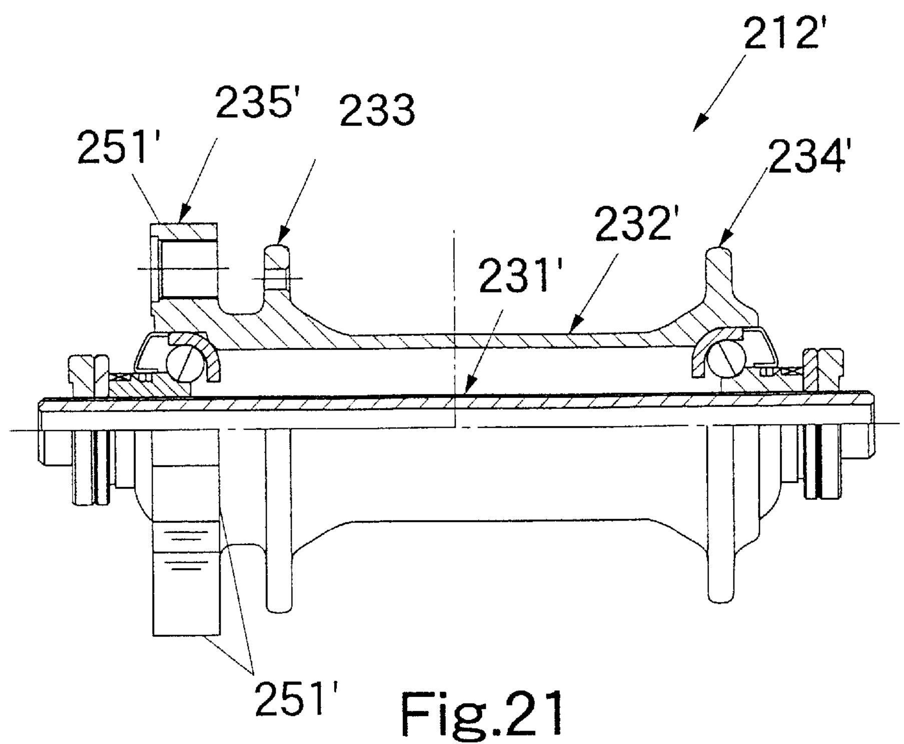
Fig.21
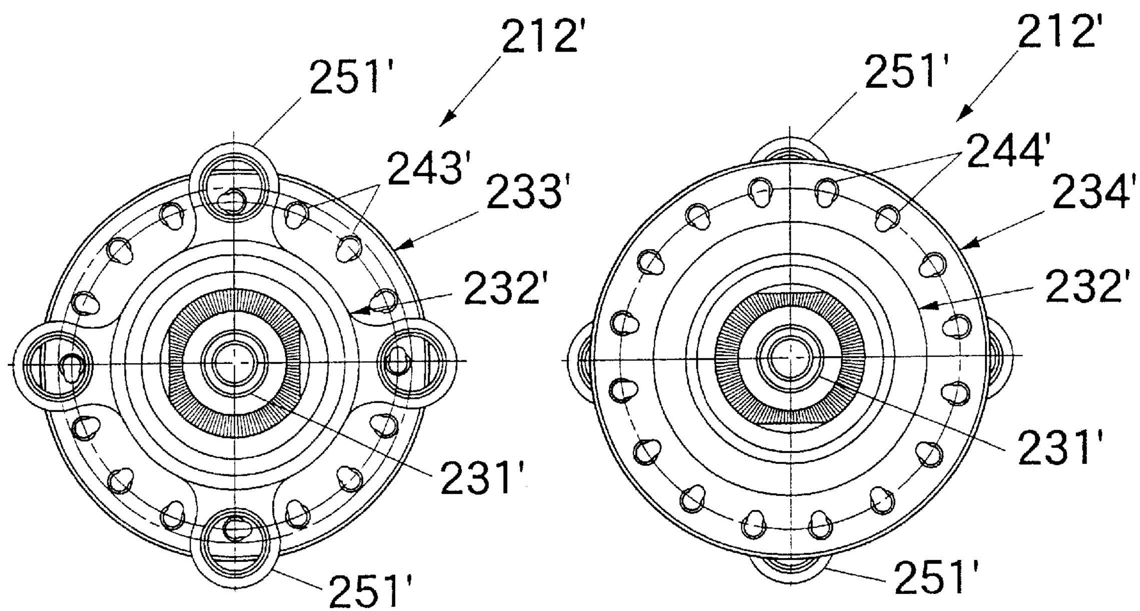
Fig.22
Fig.23

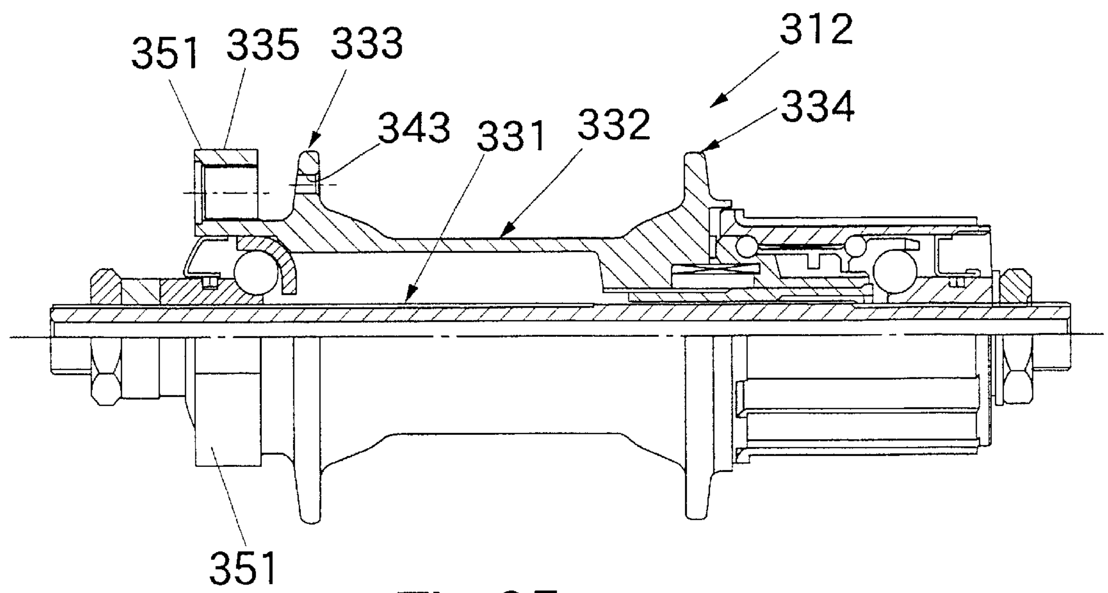
Fig.25
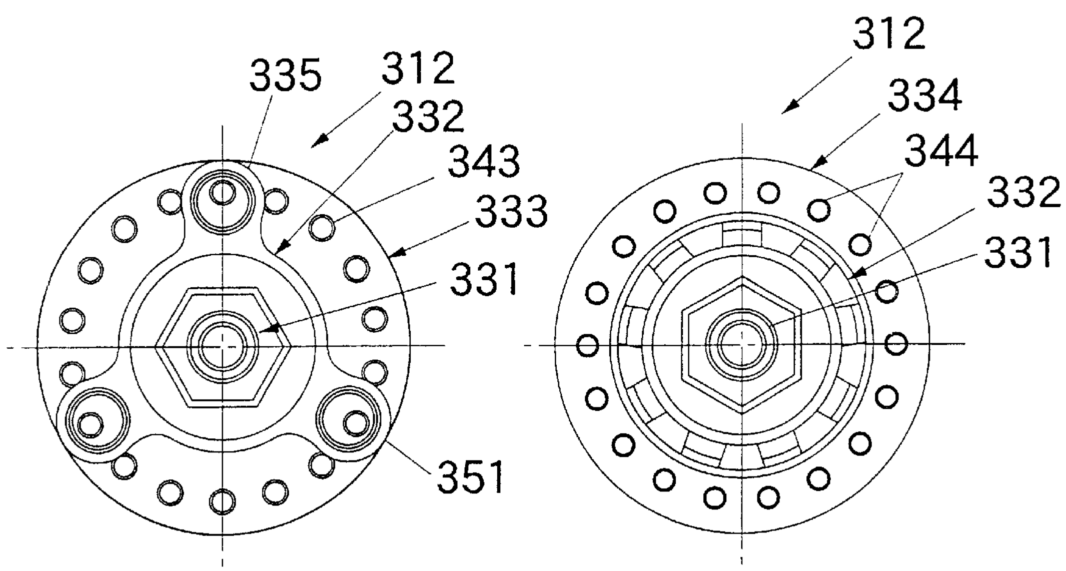
Fig.26
Fig.27

BICYCLE DISC BRAKE HUB

BACKGROUND OF THE INVENTION

1. Field of the Invention

This invention generally relates to a bicycle disc brake hub. More specifically, the present invention relates a bicycle disc brake hub with an integral rotor attachment portion or flange.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. Recently, the braking systems for bicycles have included the use of disc brakes. The use of disc brakes has resulted in modifications to the bicycle hub of the bicycle wheel so that a brake rotor can be mounted thereon.

The most basic bicycle wheels have a hub, a plurality of spokes and an annular rim. The hub is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are provided with a flange that is used to couple the spokes to the hub. In particular, holes are provided in the hub flanges. The wire spokes are usually bent on their inner end and provided with an enlarged head or flange that is formed in the shape of a nail head. The inner end is supported in one of the holes in one of the hub flanges. The outer ends of the spokes typically are provided with threads for engaging spoke nipples, which secure the outer ends of the wire spokes to the rim. In particular, the spoke nipples have flanges, which engage the interior surface of the rim.

With a spoke constructed in this manner, the nipples are installed in nipple holes formed in the rim. The spokes are inserted sideways through the holes in the hub flange until the enlarged head or flanges of the spokes engaging the areas surrounding the holes in the hub flange. The male threads on the ends of the spokes are threaded into the female threads of the spoke nipples installed in the openings of the rim.

When the hub is a disc brake hub, installation and/or replacement of the spokes can be difficult. In the case of a disk brake hub, one end of the hub usually has a brake rotor attachment portion. Often, the brake rotor attachment portion is a plurality of blind bores that receive bolts to directly mount the disc brake rotor to the end of the hub. Thus, the disc brake rotor makes it difficult to insert the spokes in a sideways direction. To overcome this problem, the spoke attachment portion adjacent the brake rotor attachment portion is often made to be larger in diameter than the brake rotor attachment portion. This increases the weight of the disk brake hub as well as the cost to manufacture the disk brake hub.

Moreover, hubs that have blind bores for mounting a disc brake rotor are time consuming to form and often become damaged. When the blind bores become damaged, the entire hub must be replaced. Thus, these prior hubs are expensive to manufacture and replace.

In view of the above, there exists a need for a bicycle hub which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle hub with an integrated brake rotor attachment portion disposed adjacent the first spoke attachment portion such spokes can easily be installed into first spoke holes of the first spoke attachment portion.

Another object of the present invention is to provide a bicycle hub with an integrated brake rotor attachment portion disposed adjacent the first spoke attachment portion that is relatively lightweight.

Another object of the present invention is to provide a bicycle hub with an integrated brake rotor attachment portion disposed adjacent the first spoke attachment portion that is relatively inexpensive to manufacture.

The foregoing objects can be attained by providing a bicycle disc brake hub comprising a hub axle, a hub shell, a first spoke attachment portion, a second spoke attachment portion and a brake rotor attachment portion. The hub axle has a center axis extending in an axial direction between a first axle end and a second axle end. The hub shell has an interior passageway extending between first and second hub shell ends with the hub axle being rotatably supported in the interior passageway. The first spoke attachment portion has a plurality of first spoke holes extending axially between the first and second axially facing surfaces. The first spoke holes have center axes spaced a first radial distance from the center axis of the hub axle. The first spoke attachment portion is disposed at the first hub shell end with the second axially facing surface facing towards the second hub shell end. The second spoke attachment portion has a plurality of second spoke holes. The second spoke attachment portion is disposed at the second hub shell end. The brake rotor attachment portion has a plurality of axially extending rotor mounting holes with predetermined diameters and center axes spaced a second radial distance from the center axis of the hub axle. The brake rotor attachment portion is disposed adjacent the first spoke attachment portion with the first axially facing surface facing towards the brake rotor attachment portion. The first spoke attachment portion and the brake rotor attachment portion are arranged relative to each other to attach spokes to the first spoke holes through the rotor mounting holes of the brake rotor attachment portion.

Preferably, the first spoke holes are individually viewable in the axial direction from a location looking axially towards the brake rotor attachment portion. The first axially facing surface of the first spoke attachment portion and the first radial distance of the first spoke holes are less than the second radial distance plus half of the predetermined diameter of one of the rotor mounting holes.

The foregoing objects can also be attained by providing a bicycle disc brake hub comprising a hub axle, a hub shell, a first spoke attachment portion, a second spoke attachment portion and a brake rotor attachment portion. The hub axle has a center axis extending in an axial direction between a first axle end and a second axle end. The hub shell has an interior passageway extending between first and second hub shell ends with the hub axle being rotatably supported in the interior passageway. The first spoke attachment portion has a plurality of first spoke holes extending axially between the first and second axially facing surfaces. The first spoke attachment portion being disposed at the first hub shell end with the second axially facing surface facing towards the second hub shell end. The second spoke attachment portion has a plurality of second spoke holes, the second spoke attachment portion being disposed at the second hub shell end. The brake rotor attachment portion has a plurality of axially extending rotor mounting holes and an outer peripheral surface that lies within an imaginary circle circumscribing the outer peripheral surface. The brake rotor attachment portion is disposed adjacent the first spoke attachment portion with the first axially facing surface facing towards the brake rotor attachment portion. The first spoke holes is located radially inward of the imaginary circle circumscribing the outer peripheral surface of the brake rotor attachment portion.

The foregoing objects can further be attained by providing a bicycle disc brake hub comprising a hub axle, a hub shell, a first spoke attachment portion, a second spoke attachment portion and a brake rotor attachment portion. The hub axle has a center axis extending in an axial direction between a first axle end and a second axle end. The hub shell has an interior passageway extending between first and second hub shell ends with the hub axle being rotatably supported in the interior passageway. The first spoke attachment portion has a plurality of first spoke holes extending axially between the first and second axially facing surfaces. The first spoke attachment portion is disposed at the first hub shell end with the second axially facing surface facing towards the second hub shell end. The second spoke attachment portion has a plurality of second spoke holes. The second spoke attachment portion being disposed at the second hub shell end. The brake rotor attachment portion has a plurality of axially extending rotor mounting holes. The brake rotor attachment portion is disposed adjacent the first spoke attachment portion with the first axially facing surface facing towards the brake rotor attachment portion. The brake rotor attachment portion and the first spoke attachment portion have maximum outer diameters with the maximum outer diameter of the first spoke attachment portion being no greater than the maximum outer diameter of the brake rotor attachment portion.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 21 is a partial longitudinal cross-sectional view of the front disc brake hub and the front disc brake rotor with the third embodiment of the present invention;

FIG. 22 is a left end elevational view of the front disc brake hub illustrated in FIG. 21 with the disc brake rotor removed;

FIG. 23 is a right end elevational view of the front disc brake hub illustrated in FIG. 21 with the disc brake rotor removed;

FIG. 25 is a partial longitudinal cross-sectional view of the rear disc brake hub and the rear disc brake rotor in accordance with a fourth embodiment of the present invention;

FIG. 26 is a left end elevational view of the rear disc brake hub illustrated in FIG. 25 with the disc brake rotor removed;

FIG. 27 is a right end elevational view of the rear disc brake hub illustrated in FIG. 25 with the disc brake rotor removed;

DETAILED DESCRIPTION OF THE PREFERRED EMBODIMENTS

Figure 1:
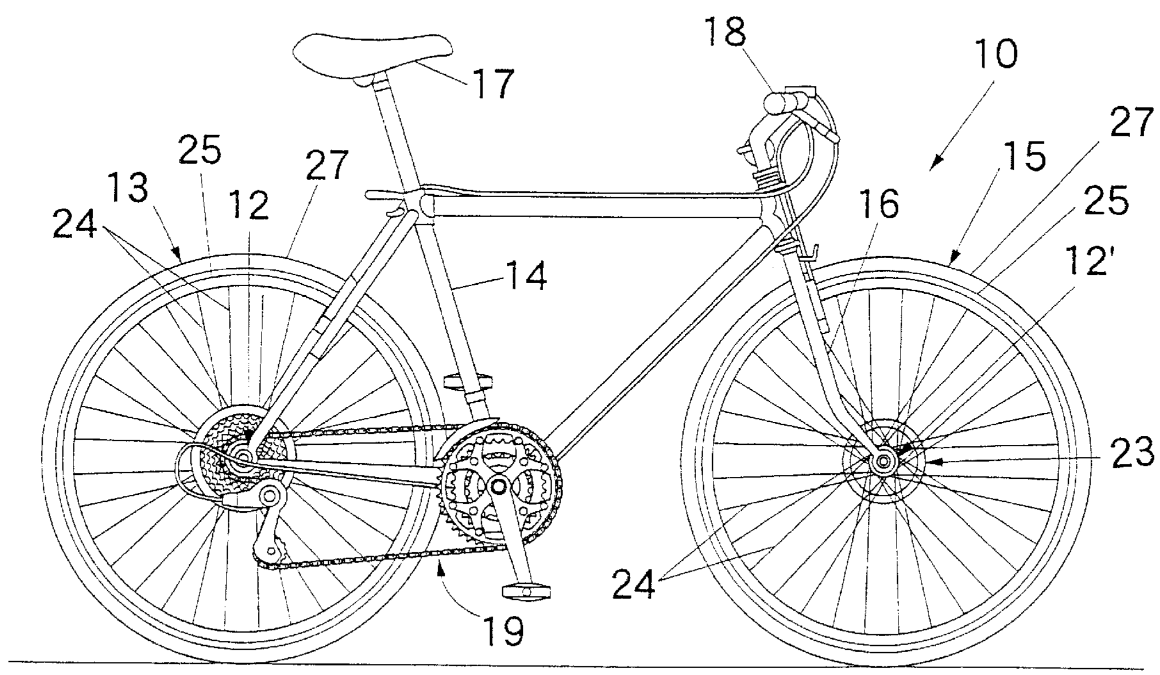
FIG. 1 is a side elevational view of a conventional bicycle with front and rear disc brake hubs in accordance with a first embodiment of the present invention.
Figure 2:
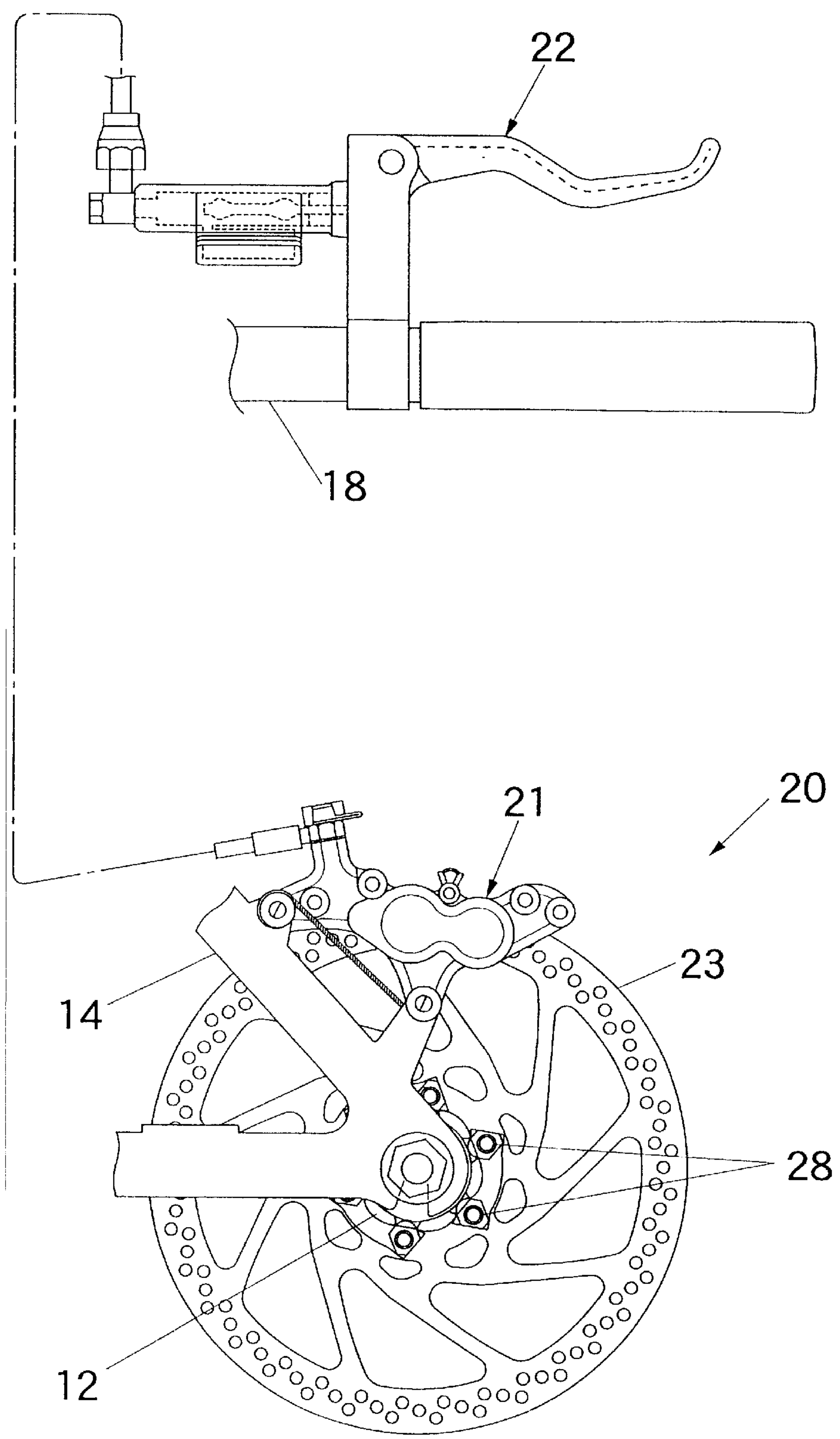
FIG. 2 is a schematic elevational view of the rear disc brake assembly coupled to a rear fork and a rear disc brake operating mechanism of the bicycle illustrated in FIG. 1.
Figure 3:
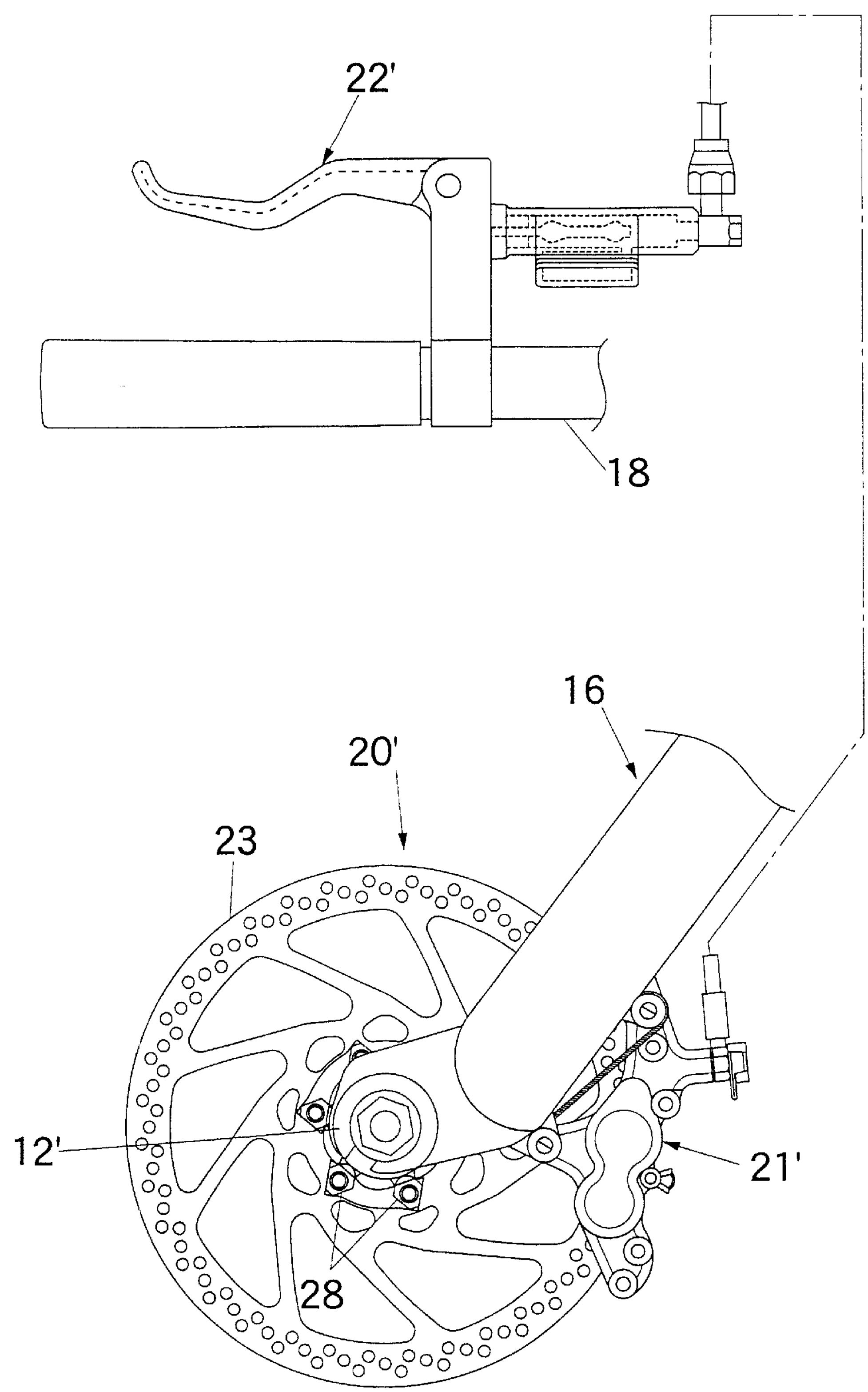
FIG. 3 is a schematic elevational view of the front disc brake assembly coupled to a front fork and a front disc brake operating mechanism of the bicycle illustrated in FIG. 1.

Referring initially to FIGS. 1–3, a bicycle 10 is illustrated with rear and front disc brake hubs 12 and 12' in accordance with a first embodiment of the present invention as discussed below. The rear disc brake hub 12 rotatably couples a rear wheel 13 to a rear portion of a frame 14 of the bicycle 10, while the front disc brake hub 12' rotatably couples a front wheel 15 to a front fork 16 of the frame 14. The frame 14 also includes a seat 17 adjustably coupled to the frame 14, a handlebar 18 coupled to the front fork 16 for turning the front wheel 15 and a drive train 19 for propelling the bicycle 10.

Since these most of the parts of the bicycle 10 are well known in the art, the parts of the bicycle 10 will not be discussed or illustrated in detail herein, except for the parts relating to the rear and front disc brake hubs 12 and 12' of the present invention. Moreover, various conventional bicycle parts such as brakes, derailleurs, additional sprocket, etc., which are not illustrated and/or discussed in detail herein, can be used in conjunction with the present invention.

As best seen in FIGS. 1–3, the bicycle 10 is also provided with rear and front disc brake assemblies 20 and 20'. The rear disc brake assembly 20 includes a caliper 21 operatively coupled to a brake lever 22 and a rear disc brake rotor 23 fixedly coupled to the rear disc brake hub 12 of the rear wheel 13. Similarly, the front disc brake assembly 20' includes a caliper 21' operatively coupled to a brake lever 22' and a front disc brake rotor 23 (same as rear rotor) fixedly coupled to the front disc brake hub 12' of the front wheel 15.

Figure 7:
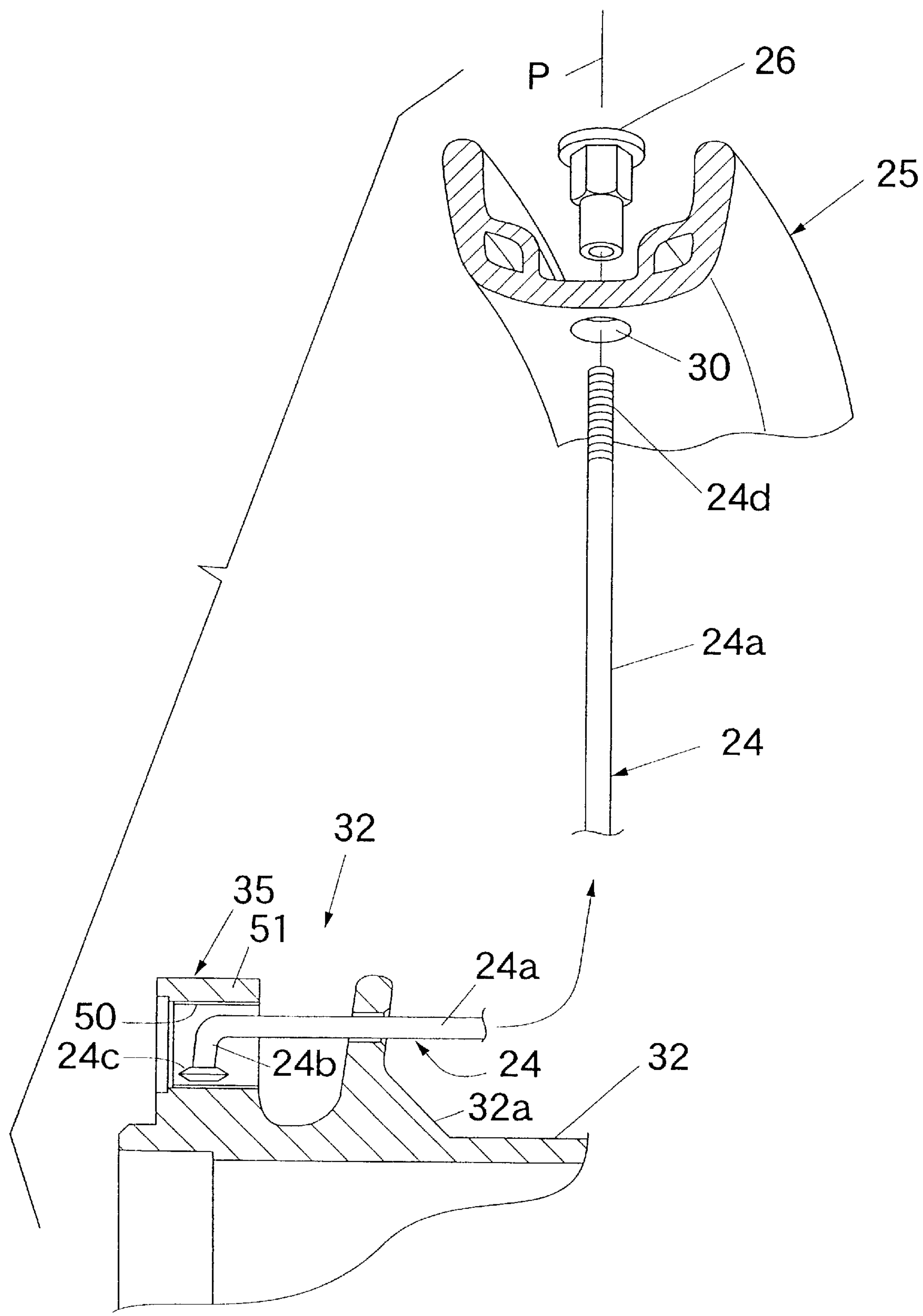
FIG. 7 is a partial exploded cross-sectional view of the rear rim and the rear disc brake hub shell with a spoke being installed thereon.

As seen in FIGS. 1 and 7, the rear and front disc brake hubs 12 and 12' of the and front wheels 13 and 15 have a plurality of spokes 24 extending outwardly therefrom. As seen in FIG. 7, the outer ends of the spokes 24 are fixedly coupled to the rim 25 by spoke nipples 26. A tire 27 is located on the outer surface of each of the rims 25 in ac conventional manner. The disc brake rotors 23 are attached to the rear and front disc brake hubs 12 and 12' by bolts 28, as explained below.

While the illustrated embodiment of the rear and front disc brake hubs 12 and 12' is used to create a pair of twenty-four spoke wheels, it will be apparent to those skilled in the art from this disclosure that other spoke arrangements are possible without departing from the present invention. For example, a thirty-two spoke wheel or a thirty-six spoke wheel can be constructed in accordance with the present invention without departing from the present invention as seen in the later embodiments. Basically, the number of spoke holes depends upon the rim to be used with the hub of the present invention.

Preferably, the spokes 24, the rims 25 and the spoke nipples 26 are all conventional parts that are used with the rear and front disc brake hubs 12 and 12' of the present invention. In other words, the unique design of the rear and front disc brake hubs 12 and 12' allows it to be used with conventional parts, e.g., conventional tangential spokes 24 and conventional rims 25. Accordingly, when the wheels 13 and 15 are assembled, the spokes 24 extend tangentially from imaginary circles centered on the center axes of rotations O and O' of the rear and front disc brake hubs 12 and 12', respectively.

The term "conventional spokes" as used herein are spokes that have a straight section **24*a* and a bent end 24*b* with an enlarged head 24*c* such that straight section 24*a* extends at an angle of about 95° relative to the bent end 24*b* as seen in FIG. 7. Such spokes are well known in the bicycle art. While the spokes 24 are illustrated as being tangentially arranged relative to the rear and front disc brake hubs 12 and 12', it will be apparent to those skilled in the art from this disclosure that other spoke arrangements are possible without departing from the present invention. For example, one end or both ends of the rear and front disc brake hubs 12 and 12' can have radially extending spokes. As seen in FIG. 7, the spokes 24 of the illustrated embodiment each have an outer threaded end 24*d* that is located at the opposite end of the center straight section 24*a* from the bent end 24*b* (inner end portion) with the enlarged head 24*c*. The bent end 24*b* has a center axis that forms an angle of about 95° with the center axis of the straight section 24*a*. The bent ends 24*b* of the spokes 24** are designed to be received within the first and second spoke holes.

The rim 25 can be any conventional rim that has a plurality of spoke holes 30 for receiving the spoke nipples 26 for attaching the outer threaded ends **24*d* of the spokes 24 thereto. In the illustrated embodiment of FIGS. 1–10, the rims 25 for the rear and front disc brake hubs 12 and 12' are conventional steel or alloy rims having a U-shaped cross section with twenty-four spoke holes 30. The spoke holes 30 are equally spaced apart in a circumferential direction. The spoke holes 30 are preferably lie in a single plane P that divides the cross section in half as seen in FIG. 7. Of course, rims with fewer or more spoke holes 30 can be used with a hub of the present invention, if needed and/or desired. For example, the rims 25 can have thirty-two or thirty-six spoke holes instead of twenty-four spoke holes, if the rear and front disc brake hubs 12 and 12'** are modified to have more spoke holes as explained below.

Rear Hub 12

As best seen in FIGS. 4–7, the bicycle disc brake hub 12 basically comprising a hub axle 31, a hub shell 32, a first spoke attachment portion 33, a second spoke attachment portion 34 and a brake rotor attachment portion 35. The bicycle disc brake hub 12 is basically a conventional hub, except for the configuration of the hub shell 32, the first spoke attachment portion 33 and the brake rotor attachment portion 35. Thus, conventional parts of the bicycle disc brake hub 12 will not illustrated and/or discussed in detail herein.

Figure 4:
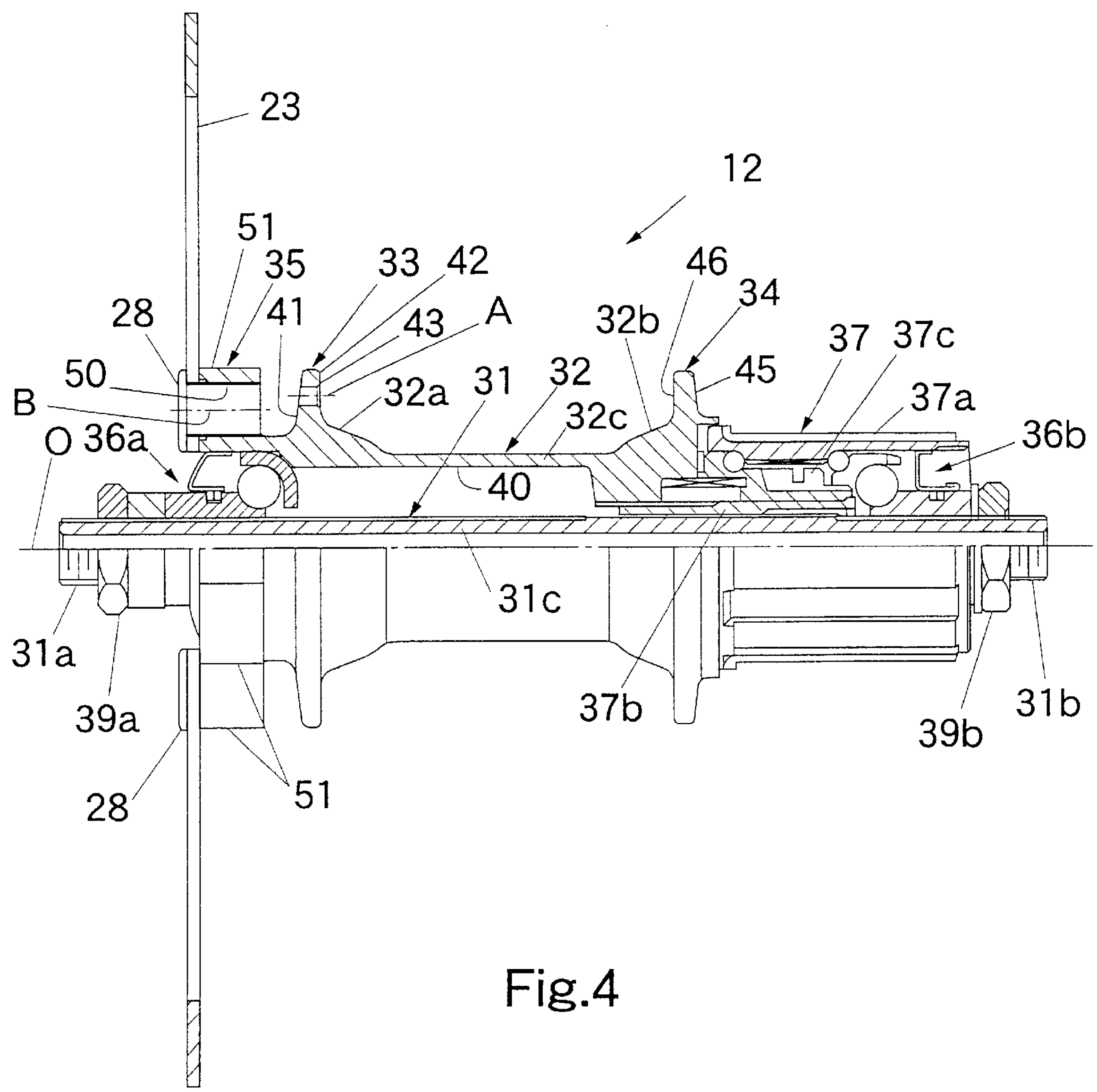
FIG. 4 is a partial longitudinal cross-sectional view of the rear disc brake hub and the rear disc brake rotor of the rear wheel illustrated in FIG. 1 with the sprockets removed.

As best seen in FIG. 4, the hub axle 31 has a center axis O extending in an axial direction between a first axle end **31*a* and a second axle end 31*b*. The hub axle 31 has a center bore 31*c* such that a quick release mechanism (not shown) is coupled to the hub axle 31 in a conventional manner. The hub axle 31 rotatably supports the hub shell 32 by first and second bearing assemblies 36*a* and 36*b*. The second axle end 31*b* has a freewheel 37 operatively coupled between the hub axle 31 and the hub shell 32 in a conventional manner. The hub shell 32 is fixed with respect to the hub axle 31 in one rotational direction by the freewheel 37, while the freewheel 37 allows the hub shell 32 to freely rotate with respect to the hub axle 31 in the opposite rotational direction. The first and second ends 31*a* and 31*b* of the hub axle 31 are threaded for receiving a pair of nuts 39*a* and 39*b* that applies an axial force on the hub shell 32, the bearing assemblies 36***a* and 36*b* and the freewheel 37.

The hub shell 32 is a tubular member that has an interior passageway 40 extending between first and second hub shell ends 32*a* and 32*b* with the hub axle 31 being rotatably supported in the interior passageway 40. In particular, the first and second bearing assemblies 36*a* and 36*b* rotatably mount the hub shell 32 within the interior passageway 40. The hub shell 32 also has a center tubular portion 32*c* located between the first and second hub shell ends 32*a* and 32*b,* which are integral formed with the center tubular portion 32*c* as a one-piece, unitary member. The first and second spoke attachment portions 33 and 34 and the brake rotor attachment portion 35 are integrally formed with the hub shell 32 as a one-piece, unitary member. In particular, the first hub shell end 32*a* has the first spoke attachment portion 33 and the brake rotor attachment portion 35 integrally mounted thereon, while the second hub shell end 32*b* has the second spoke attachment portion 34 integrally mounted thereon.

The second hub shell end 32*b* has the freewheel 37 fixedly coupled thereto. The freewheel 37 is attached between the second hub shell end 32*b* and the second axle end 31*b* to allow the hub axle 31 to rotate freely relative to the hub shell 32 in one direction, but fixedly couples the hub axle 31 relative to the hub shell 32 in the opposite rotational direction.

The bearing assemblies 36*a* and 36*b* rotatably support the hub shell 32 on the hub axle 31. Since the bearing assemblies 36*a* and 36*b* are well known in the bicycle art, they will not be discussed or illustrated in detail herein. The bearing assembly 36*a* basically includes a plurality of balls located between an inner race member and an outer race member in a conventional manner. Similarly, the bearing assembly 36*b* basically includes a plurality of balls located between an inner race member and an outer race member in a conventional manner.

Bicycle freewheels, such as the freewheel 37, are well known in the bicycle art, and thus, the freewheel 37 will not be illustrated or discussed in detail herein. The freewheel 37 is used to transmit a driving force from the chain to the rear bicycle wheel in one rotation direction only. The freewheel 37 allows the bicycle 10 to advance freely without any rotation of the pedals. The freewheel 37 is fastened to the rear hub 12 as integral part of the rear hub 12 in a conventional manner. The freewheel 37 basically includes an outer tubular part 37*a,* an inner tubular part 37*b* and a one-way clutch 37*c.* The inner tubular part 37*b* is installed radially inwardly of the outer tubular part 37*a* so that the inner tubular part 37*b* is free to rotate relative to the outer tubular part 37*a*. The one-way clutch 37*c* is installed between the outer tubular part 37*a* and inner tubular part 37*b* for transmitting the driving force from the outer tubular part 37*a* to the inner tubular part 37*b* in one rotational direction only. The outer tubular part 37*a* has a plurality of gears or sprockets (not shown) mounted thereon, while the inner tubular part 37*b* is fixedly mounted on the hub axle 31.

The first spoke attachment portion 33 is preferably an annular spoke flange located at the first hub shell end 32*a* of the hub shell 32. The first spoke attachment portion 33 has a plurality of first spoke holes 43. In this embodiment, the first spoke attachment portion 33 has twelve of the first spoke holes 43 equally spaced apart about an imaginary circle $C_1$ that is centered about the center axis O. The first spoke holes 43 are arranged to receiving the bent ends 24*b* of the spokes 24.

The first spoke holes 43 have their center axes A parallel to the center axis O of the hub axle 31. The first spoke holes 43 lie on the imaginary circle $C_1$ that is centered on the center axis O of the hub axle 31. In particular, the first spoke attachment portion 33 has a first (outer) axially facing surface 41 and a second (inner) axially facing surface 42 with the first spoke holes 43 extending axially between the first (outer) axially facing surface 41 and the second (inner) axially facing surface 42. Thus, the first spoke attachment portion 33 is disposed at the first hub shell end 32*a* with the second axially facing surface 42 facing towards the second hub shell end 32*b*. The first spoke holes 43 have their center axes A spaced a first radial distance $R_1$ from the center axis O of the hub axle 31.

In this embodiment, each of the first spoke holes 43 has a transverse cross section with a semi circular section 43*a* and a notched section 43*b* that extends outwardly from the semi circular section 43*a* in a radial direction relative to its center axis A. This shape of the first spoke holes 43 allows for easy insertion of the spokes 24 into the first spoke holes 43 during assembly of the spokes 24 to the bicycle disc brake hub 12. The semi circular section 43*a* preferably extends at least about 180° and more preferably about 300° to securely retain the bent ends 24*b* of the spokes 24 therein. The notched section 43*b* preferably extends outwardly at least about half of the diameter of the semi circular section 43*a* from the circumference of the circle defining the second semi circular section 43*a.* The notched sections 43*b* of the first spoke holes 43 are oriented so that every other one of the notched sections 43*b* points towards the center axis O of the hub axle 31, while other notched sections 43*b* point in a circumferential direction.

Figure 6:
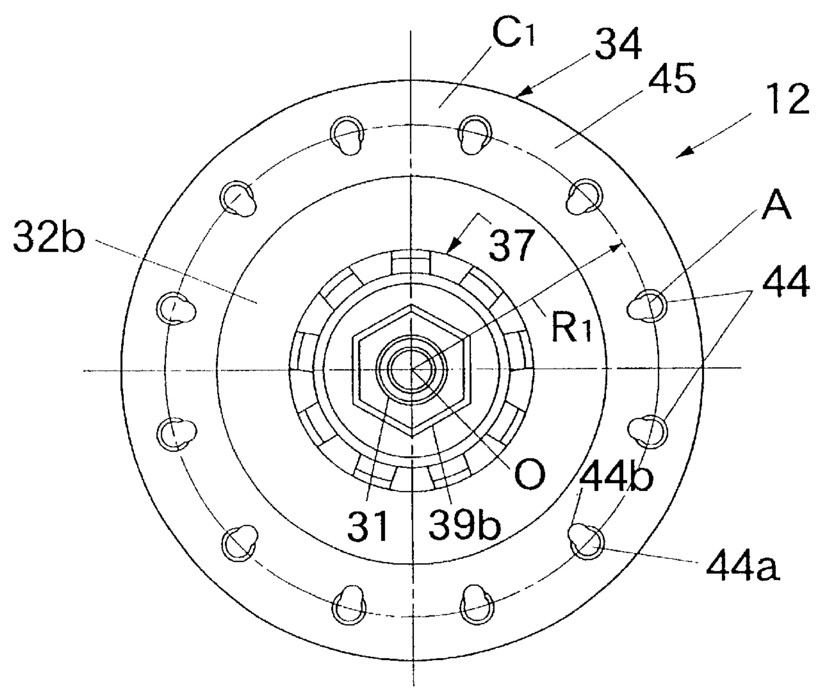
FIG. 6 is a right end elevational view of the rear disc brake hub illustrated in FIG. 4 with the disc brake rotor removed.

Similarly, as best seen in FIG. 6, the second hub shell end 32*b* of the hub shell 32 is provided with a plurality of second spoke holes 44 for receiving the bent ends 24*b* of the spokes 24. In the illustrated embodiment, the second hub shell end 32*b* is provided with twelve of the second spoke holes 44 equally spaced apart about the imaginary circle $C_1$ that is centered on the center axis O of the hub axle 31. Each of the spoke holes 44 is also designed to receive one of the bent ends 24*b* of the spokes 24. Accordingly, the rear hub 12 is designed to have twenty-four spokes extending outwardly therefrom in a generally tangential direction.

The second spoke attachment portion 34 is preferably an annular spoke flange located at the second hub shell end 32*b* of the hub shell 32. The second spoke holes 44 have their center axes A parallel to the center axis O of the hub axle 31. The second spoke holes 44 lie on the imaginary circle $C_1$ centered on the center axis O of the hub axle 31. In particular, the second spoke attachment portion 34 has a first (outer) axially facing surface 45 and a second (inner) axially facing surface 46 with the second spoke holes 44 extending axially between the first (outer) axially facing surface 45 and the second (inner) axially facing surface 46. Thus, the second spoke attachment portion 34 is disposed at the second hub shell end 32*b* with the second axially facing surface 46 facing towards the first hub shell end 32*a.* The second spoke holes 44 have their center axes A spaced a radial distance $R_1$ from the center axis O of the hub axle 31. The center axes A of the second spoke holes 44 are circumferentially offset from the center axes A of the first spoke holes 43 such that the spoke holes 43 are located between the spoke holes 44.

Figure 5:
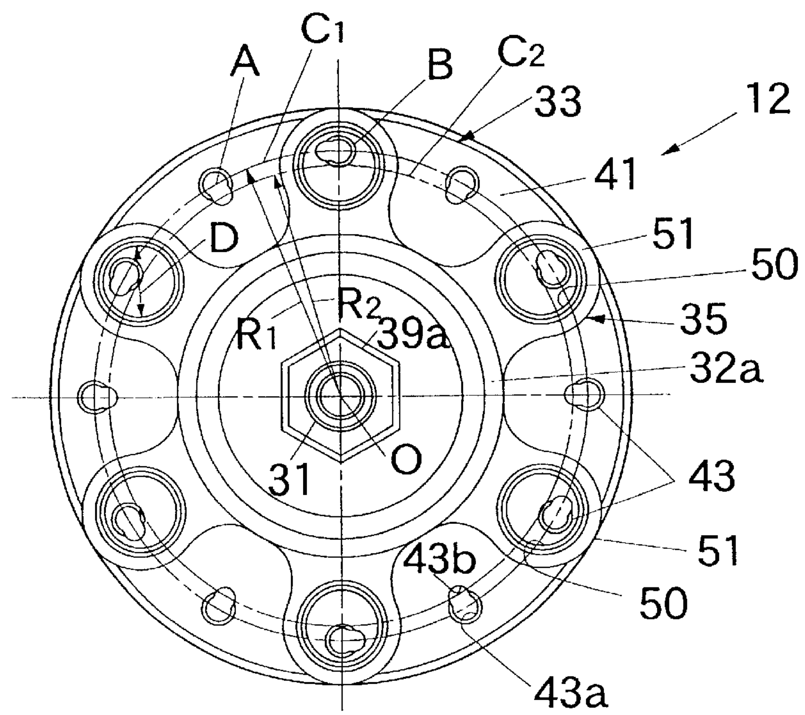
FIG. 5 is a left end elevational view of the rear disc brake hub illustrated in FIG. 4 with the disc brake rotor removed.

In this embodiment, each of the second spoke holes 44 has a transverse cross section with a semi circular section 44*a* and a notched section 44*b* that extends outwardly from the semi circular section 44*a* in a radial direction relative to its center axis A. This shape of the second spoke holes 44 allows for easy insertion of the spokes 24 into the second spoke holes 44 during assembly of the spokes 24 to the bicycle disc brake hub 12. The semi circular section 44*a* preferably extends at least about 180° and more preferably about 300° to securely retain the bent ends 24*b* of the spokes 24 therein. The notched section 44*b* preferably extends outwardly at least about half of the diameter of the semi circular section 44*a* from the circumference of the circle defining the semi circular section 44*a*. Preferably, the first and second spoke holes 43 and 44 are identical in cross section, but have different orientations of the notched sections 43*b* and 44*b* as seen in FIGS. 5 and 6.

As mentioned above, the first and second spoke holes 43 and 44 are designed to be used with conventional tangential spokes 24. Alternatively, the spokes 24 can be radially arranged in either or both of the first and second spoke holes 43 and 44. Preferably, the first and second spoke attachment portion 33 and 34 are substantially identical, except for the orientations of the notched sections 43*b* and 44*b* of the first and second spoke holes 43 and 44 as seen in FIGS. 5 and 6. Of course, it is possible that the second spoke attachment portion 34 can be different from the first spoke attachment portion 33 such that the first and second spoke attachment portions 33 and 34 can have different types of spoking arrangements.

The brake rotor attachment portion 35 is integrally formed with the first hub end 32*a* of the hub shell 32 as a one-piece, unitary member of the hub shell 32. The brake rotor attachment portion 35 has a plurality of axially extending rotor mounting holes or bores 50 with predetermined diameters D and center axes B spaced a second radial distance $R_2$ from the center axis O of the hub axle 31. The brake rotor attachment portion 35 is disposed adjacent the first spoke attachment portion 33 with the first axially facing surface 41 of the first spoke attachment portion 33 facing towards the brake rotor attachment portion 35.

In the illustrated embodiment, the brake rotor attachment portion 35 is formed with six attachment members or mounting flanges 51 with the mounting holes or bores 50 extending axially therethrough. The mounting holes 50 are preferably internally threaded. Thus, the disc brake rotor 23 is fixedly coupled the brake rotor attachment portion 35 by the bolts 28.

The first spoke attachment portion 33 and the brake rotor attachment portion 35 are arranged relative to each other such that the first spoke holes 43 are individually viewable in the axial direction from a location looking axially towards the brake rotor attachment portion 35 and the first axially facing surface 41 of the first spoke attachment portion 33. In particular, the first spoke holes 43 are individually viewable in the axial direction through the rotor mounting holes 50 and between the mounting flanges 51. While six individual mounting flanges 51 are illustrated, it will be apparent to those skilled in the art from this disclosure that fewer or more attachment points can be utilized. Moreover, it will be apparent to those skilled in the art from this disclosure that the brake rotor attachment portion 35 can be a continuous flange with addition holes such that each of the first spoke holes 43 are individually viewable in the axial direction through the brake rotor attachment portion 35.

In this first embodiment, the first spoke holes 43 lie on the imaginary circle $C_1$, while the mounting holes 50 lie on an imaginary circle $C_2$ that is smaller than the imaginary circle $C_1$. The first radial distance $R_1$ of the first spoke holes 43 are less than the second radial distance $R_2$ plus half of the predetermined diameter D of one of the rotor mounting holes 51. This arrangement allows one of the first spoke holes 43 to be view through each of the rotor mounting holes 51. Thus, the annular spoke flange forming the first spoke attachment portion 33 has an outer diameter that is no greater than an effective outer diameter formed by the mounting flanges 51. In fact, this arrangement allows the outer diameter of the first spoke attachment portion 33 to be less than the effective outer diameter formed by the mounting flanges 51.

To aid in the installation of the spokes 24 into the first spoke holes 43, the center axes A of the first spoke holes 43 are preferably offset from the center axes B of the corresponding ones of the rotor mounting holes 51. In this embodiment, the center axes A of the first spoke holes 43 lie on the imaginary circle $C_1$ that is larger than the imaginary circle $C_2$ having the center axes B of the rotor mounting holes 51. Thus, the first radial distance $R_1$ of the center axes A of the first spoke holes 43 from the center axis O of the hub axle 31 is greater than the second radial distance $R_2$ of the center axes B of the rotor mounting holes 51 from the center axis of the hub axle 31. Of course, the first radial distance RI of the center axes A of the first spoke holes 43 from the center axis O of the hub axle 31 can be less than the second radial distance $R_2$ of the center axes B of the rotor mounting holes 51 from the center axis of the hub axle 31 as seen in the front hub 12' of FIGS. 8–10.

Front Hub 12'

Figure 8:
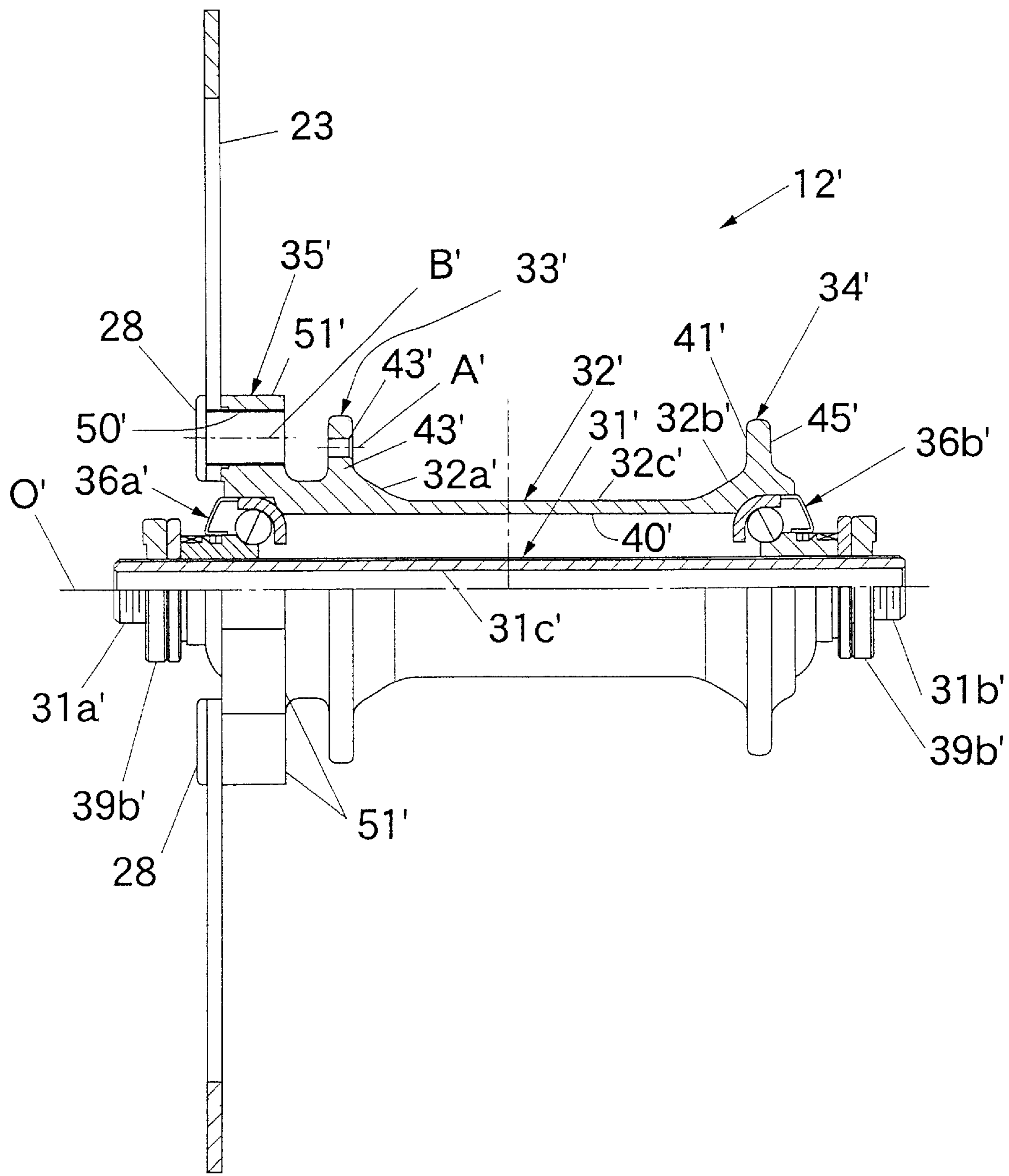
FIG. 8 is a partial longitudinal cross-sectional view of the front disc brake hub and the front disc brake rotor of the front wheel illustrated in FIG. 1.
Figure 9:
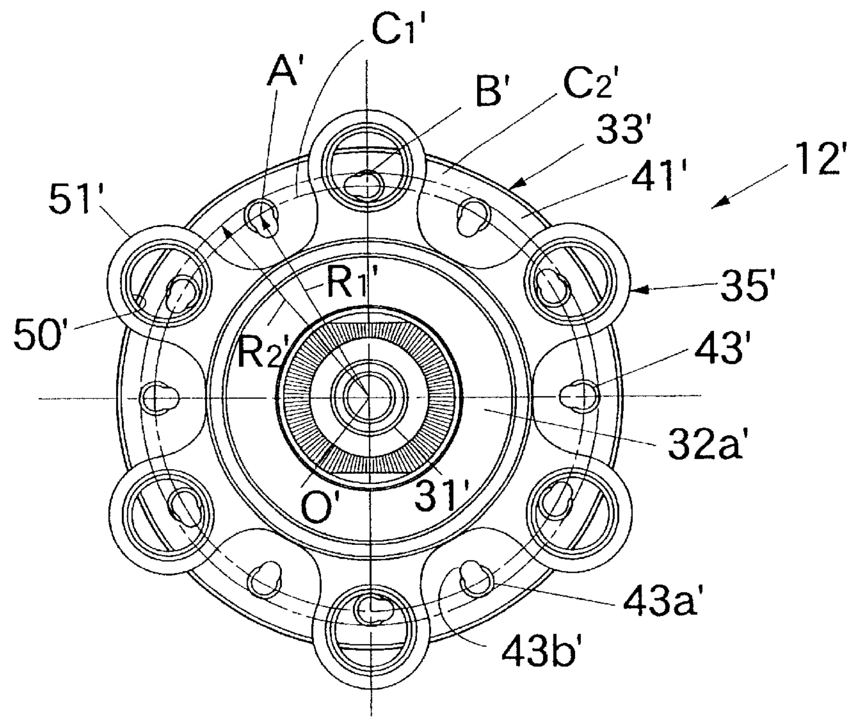
FIG. 9 is a left end elevational view of the front disc brake hub illustrated in FIG. 8 with the disc brake rotor removed.
Figure 10:
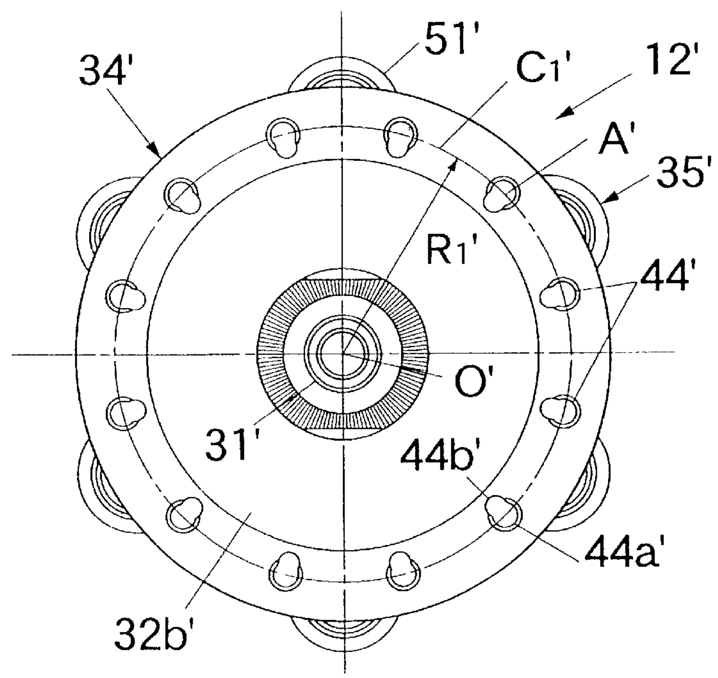
FIG. 10 is a right end elevational view of the front disc brake hub illustrated in FIG. 8 with the disc brake rotor removed.

Turning now to FIGS. 8–10, the front hub 12' is illustrated in accordance with the present invention. The front hub 12' is substantially identical to the rear hub 12, except that the front hub 12' does not have a freewheel and the spoke holes 43' and 44' lie on imaginary circles $C_1'$ having smaller diameters than the imaginary circles $C_1$ formed by the spoke holes 43 and 44 of the rear hub 12.

As best seen in FIG. 8, the bicycle disc brake hub 12' basically comprising a hub axle 31', a hub shell 32', a first spoke attachment portion 33', a second spoke attachment portion 34' and a brake rotor attachment portion 35'. The bicycle disc brake hub 12' is basically a conventional hub, except for the configuration of the hub shell 32', the first spoke attachment portion 33' and the brake rotor attachment portion 35'. Thus, conventional parts of the bicycle disc brake hub 12' will not illustrated and/or discussed in detail herein.

The hub axle 31 ' has a center axis O' extending in an axial direction between a first axle end 31*a*' and a second axle end 31*b*'. The hub axle 31' has a center bore 31*c*' such that a quick release mechanism (not shown) is coupled to the hub axle 31' in a conventional manner. The hub axle 31' rotatably supports the hub shell 32' by first and second bearing assemblies 36*a*' and 36*b*'. The first and second ends 31*a*' and 31*b*' of the hub axle 31' are threaded for receiving a pair of nuts 39*a*' and 39*b*' that applies an axial force on the hub shell 32' and the bearing assemblies 36*a*' and 36*b*'.

The hub shell 32' is a tubular member that has an interior passageway 40' extending between first and second hub shell ends 32*a*' and 32*b*' with the hub axle 31' being rotatably supported in the interior passageway 40'. In particular, the first and second bearing assemblies 36*a*' and 36*b*' rotatably mount the hub shell 32' within the interior passageway 40'. The hub shell 32' also has a center tubular portion 32*c*' located between the first and second hub shell ends 32*a*' and 32*b*', which are integral formed with the center tubular portion 32*c*' as a one-piece, unitary member. The first and second spoke attachment portions 33' and 34' and the brake rotor attachment portion 35' are integrally formed with the hub shell 32' as a one-piece, unitary member. In particular, the first hub shell end 38*a*' has the first spoke attachment portion 33' and the brake rotor attachment portion 35' integrally mounted thereon, while the second hub shell end 32*b*' has the second spoke attachment portion 34' integrally mounted thereon.

The bearing assemblies 36*a*' and 36*b*' rotatably support the hub shell 32' on the hub axle 31'. Since the bearing assemblies 36*a*'and 36*b*' are well known in the bicycle art, they will not be discussed or illustrated in detail herein. The bearing assembly 36*a*' basically includes a plurality of balls located between an inner race member and an outer race member in a conventional manner. Similarly, the bearing assembly 36*b*' basically includes a plurality of balls located between an inner race member and an outer race member in a conventional manner.

The first spoke attachment portion 33' is preferably an annular spoke flange that is located at the first hub shell end 32*a*' of the hub shell 32'. The first spoke attachment portion 33' has a plurality of first spoke holes 43'. In this embodiment, the first spoke attachment portion 33' has twelve of the first spoke holes 43' equally spaced apart about the imaginary circle $C_1$'. The first spoke holes 43' are arranged to receiving the bent ends 24*b*' of the spokes 24'.

The first spoke holes 43' have their center axes A' parallel to the center axis O' of the hub axle 31'. The first spoke holes 43' lie on the imaginary circle $C_1$' that is centered on the center axis O' of the hub axle 31'. In particular, the first spoke attachment portion 33' has a first (outer) axially facing surface 41' and a second (inner) axially facing surface 42' with the first spoke holes 43' extending axially between the first (outer) axially facing surface 41' and the second (inner) axially facing surface 42'. Thus, the first spoke attachment portion 33' is disposed at the first hub shell end 32*a*' with the second axially facing surface 42' facing towards the second hub shell end 32*b*'. The first spoke holes 43' have their center axes A' spaced a first radial distance $R_1$' from the center axis O' of the hub axle 31'.

In this embodiment, each of the first spoke holes 43' has a transverse cross section with a semi circular section 43*a*' and a notched section 43*b*' that extends outwardly from the semi circular section 43*a*' in a radial direction relative to its center axis A'. This shape of the first spoke holes 43' allows for easy insertion of the spokes 24' into the first spoke holes 43' during assembly of the spokes 24' to the bicycle disc brake hub 12'. The semi circular section 43*a*' preferably extends at least about 180° and more preferably about 300° to securely retain the bent ends 24*b*' of the spokes 24' therein. The notched section 43*b*' preferably extends outwardly at least about half of the diameter of the semi circular section 43*a*' from the circumference of the circle defining the second semi circular section 43*a*'. The notched sections 43*b*' of the first spoke holes 43' are oriented so that every other one of the notched sections 43*b*' points towards the center axis O' of the hub axle 31', while other notched sections 43*b*' point in a circumferential direction.

Similarly, the second hub shell end 32*b*' of the hub shell 32' is provided with a plurality of second spoke holes 44' for receiving the bent ends 24*b*' of the spokes 24'. In the illustrated embodiment, the second hub shell end 32*b*' is provided with twelve of the second spoke holes 44' equally spaced apart about the imaginary circle $C_1$' that is centered on the center axis O' of the hub axle 31'. Each of the spoke holes 44' is also designed to receive one of the bent ends 24*b*' of the spokes 24'. Accordingly, the rear hub 12' is designed to have twenty-four spokes extending outwardly therefrom in a generally tangential direction.

The second spoke attachment portion 34' is preferably an annular spoke flange located at the second hub shell end 32*b*' of the hub shell 32'. The second spoke holes 44' have their center axes A' parallel to the center axis O' of the hub axle 31'. The second spoke holes 44' lie on the imaginary circle $C_1$' that is centered on the center axis O' of the hub axle 31'. In particular, the second spoke attachment portion 34' has a first (outer) axially facing surface 45' and a second (inner) axially facing surface 46' with the second spoke holes 44' extending axially between the first (outer) axially facing surface 45' and the second (inner) axially facing surface 46'. Thus, the second spoke attachment portion 34' is disposed at the second hub shell end 32*b*' with the second axially facing surface 46' facing towards the first hub shell end 32*a*'. The second spoke holes 44' have their center axes A' spaced a radial distance $R_1$' from the center axis O' of the hub axle 31'.

In this embodiment, preferably, the first and second spoke holes 43' and 44' are identical. Thus, each of the second spoke holes 44' has a transverse cross section with a semi circular section 44*a*' and a notched section 44*b*' that extends outwardly from the semi circular section 44*a*' in a radial direction relative to its center axis A'. This shape of the second spoke holes 44' allows for easy insertion of the spokes 24' into the second spoke holes 44' during assembly of the spokes 24' to the bicycle disc brake hub 12'. The semi circular section 44*a*' preferably extends at least about 180° and more preferably about 300° to securely retain the bent ends 24*b*' of the spokes 24' therein. The notched section 44*b*' preferably extends outwardly at least about half of the diameter of the semi circular section 44*a*' from the circumference of the circle defining the semi circular section 44*a*'.

As mentioned above, the first and second spoke holes 43' and 44' are designed to be used with conventional tangential spokes 24'. Alternatively, the spokes 24' can be radially arranged. Preferably, the first and second spoke attachment portion 33' and 34' are substantially identical. Of course, it is possible that the second spoke attachment portion 34' can be different from the first spoke attachment portion 33' such that the first and second spoke attachment portions 33' and 34' can have different spoking arrangements.

The brake rotor attachment portion 35' is integrally formed with the first hub end 32*a*' of the hub shell 32' as a one-piece, unitary member. The brake rotor attachment portion 35' has a plurality of axially extending rotor mounting holes or bores 50' with predetermined diameters D' and center axes B' spaced a second radial distance $R_2$' from the center axis O' of the hub axle 31'. The brake rotor attachment portion 35' is disposed adjacent the first spoke attachment portion 33' with the first axially facing surface 41' of the first spoke attachment portion 33' facing towards the brake rotor attachment portion 35'.

In the illustrated embodiment, the brake rotor attachment portion 35' is formed with six attachment members or mounting flanges 51' with the mounting holes or bores 50' extending axially therethrough. The mounting holes 50' are preferably internally threaded. Thus, the disc brake rotor 23 is fixedly coupled the brake rotor attachment portion 35' by the bolts 28.

The first spoke attachment portion 33' and the brake rotor attachment portion 35' are arranged relative to each other such that the first spoke holes 43' are individually viewable in the axial direction from a location looking axially towards the brake rotor attachment portion 35' and the first axially facing surface 41' of the first spoke attachment portion 33'. In particular, the first spoke holes 43' are individually viewable in the axial direction through the rotor mounting holes 50' and between the mounting flanges 51'. While six individual mounting flanges 51' are illustrated, it will be apparent to those skilled in the art from this disclosure that fewer or more attachment points can be utilized. Moreover, it will be apparent to those skilled in the art from this disclosure that the brake rotor attachment portion 35' can be a continuous flange with addition holes such that each of the first spoke holes 43' are individually viewable in the axial direction through the brake rotor attachment portion 35'.

The imaginary circle $C_1'$ of the first spoke holes 43' is less than the imaginary circle $C_2'$ of the rotor mounting holes 51'. Moreover, the first radial distance $R_1'$ of the first spoke holes 43' are greater than the second radial distance $R_2'$ minus half of the predetermined diameter D' of one of the rotor mounting holes 51'. This arrangement allows one of the first spoke holes 43' to be view through each of the rotor mounting holes 51'. Thus, the annular spoke flange forming the first spoke attachment portion 33' has an outer diameter that is no greater than an effective outer diameter formed by the mounting flanges 51'. In fact, this arrangement allows the outer diameter of the first spoke attachment portion 33' to be less than the effective outer diameter formed by the mounting flanges 51'.

To aid in the installation of the spokes 24' into the first spoke holes 43', the center axes A' of the first spoke holes 43' are preferably offset from the center axes B' of the corresponding ones of the rotor mounting holes 51'. In this first embodiment of the front hub 12', the center axes A' of the first spoke holes 43' lie on the imaginary circle $C_1'$ that is smaller than the imaginary circle $C_2'$ having the center axes B' of the rotor mounting holes 51'. Thus, the first radial distance $R_1'$ of the center axes A' of the first spoke holes 43' from the center axis O' of the hub axle 31' is less than the second radial distance $R_2'$ of the center axes B' of the rotor mounting holes 51' from the center axis of the hub axle 31'. Of course, the first radial distance $R_1'$ of the center axes A of the first spoke holes 43' from the center axis O' of the hub axle 31' can be greater than the second radial distance $R_2'$ of the center axes B' of the rotor mounting holes 51' from the center axis of the hub axle 31' as seen in the rear hub 12 of FIGS. 4–6.

Bicycle Brake Rotor

Figure 11:
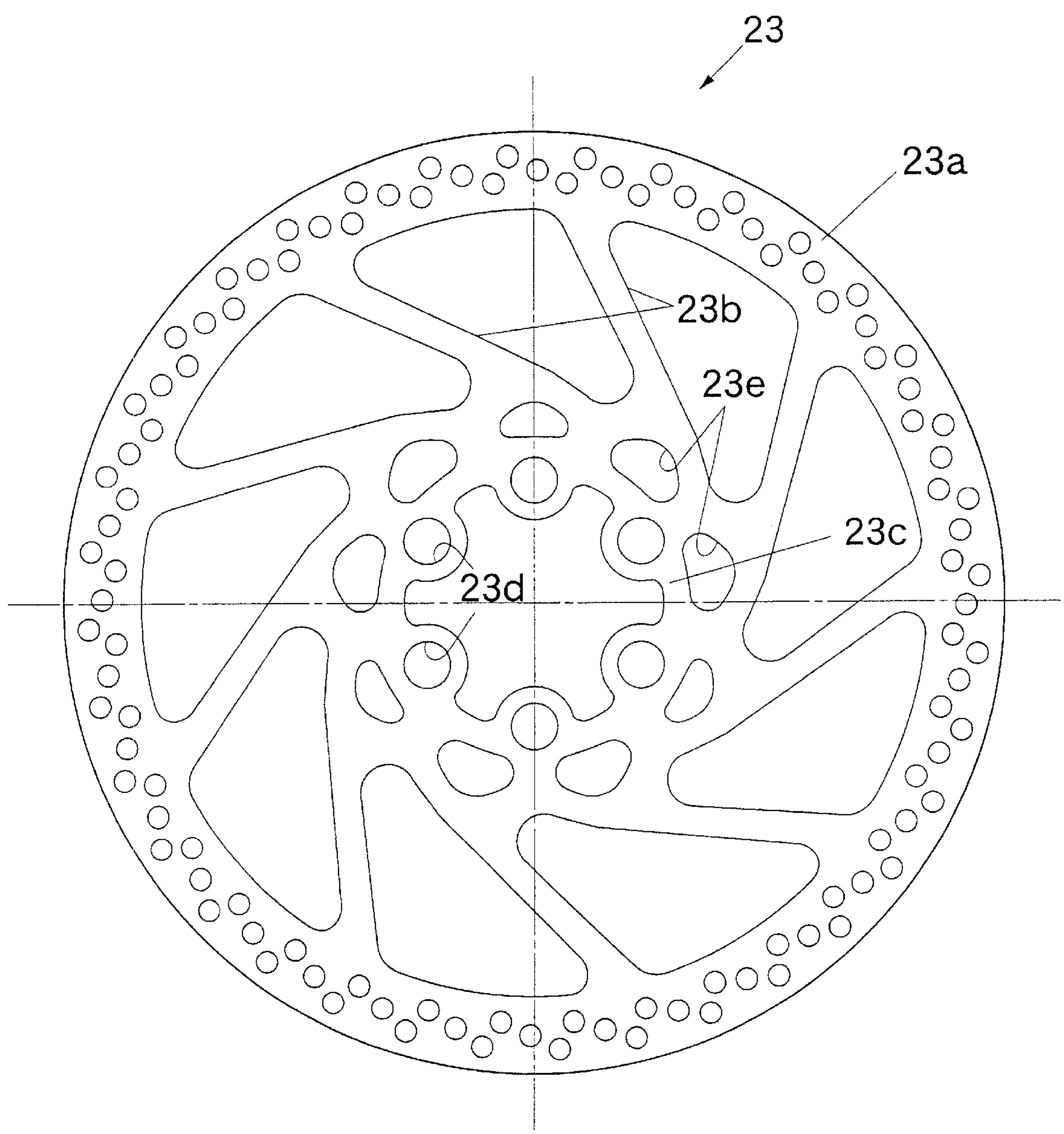
FIG. 11 is a side elevational view of the disc brake rotor in accordance with the first embodiment of the present invention.

Referring now to FIG. 11, the bicycle brake rotor 23 basically includes an annular braking ring **23*a*, a plurality (nine) of outwardly extending connecting arms 23*b* integrally formed with annular braking ring 23*a*, and an inner mounting portion 23*c* integrally formed with the connecting arms 23*b*. Accordingly, the bicycle brake rotor 23 is a one-piece, unitary member. Preferably, the bicycle brake rotor 23** is constructed of any suitable rigid material.

The annular braking ring **23*a* is preferably vented with a plurality of holes. The annular braking ring 23*a* forms an outer braking portion of the bicycle brake rotor 23. The outer ends of the connecting arms 23*b* are equally spaced about the inner edge of the annular braking ring 23*a*.**

The connecting arms **23*b* form an intermediate connecting portion of the bicycle brake rotor 23 extending between the annular braking ring 23*a* and the inner mounting portion 23*c*. These connecting arms 23*b* extend tangentially from the inner mounting portion 23*c*. The connecting arms 23*b*** have triangular openings located therebetween.

The inner mounting portion **23*c* has a plurality (six) of axially extending attachment holes 23*d*. The attachment holes 23*d* have diameters of at least seven millimeters, preferably diameters of eight millimeters. The attachment holes 23*d* are equally spaced about the circumference of the inner mounting portion 23*c*. The inner mounting portion 23*c* also has a plurality of cutouts 23*e*, with one of the cutouts 23*e* located at the base of one of the inner ends of the connecting arms 23*b*.**

Second Embodiment

Referring now to FIGS. 12–17, a pair of alternate bicycle disc brake hubs 112 and 112' are illustrated in accordance with second embodiments of the present invention. These alternate bicycle disc brake hubs 112 and 112' are designed to be used with the bicycle brake rotor 23 illustrated in FIG. 11. In view of the similarity between the first and second embodiments, the descriptions of the parts of the second embodiment that are identical to the parts of the first embodiment may be omitted for the sake of brevity. Moreover, the parts of the second embodiment that have the same functions as the parts of the first embodiment will be given the same reference numerals as the parts of the first embodiment, but increased by one hundred.

Figure 12:
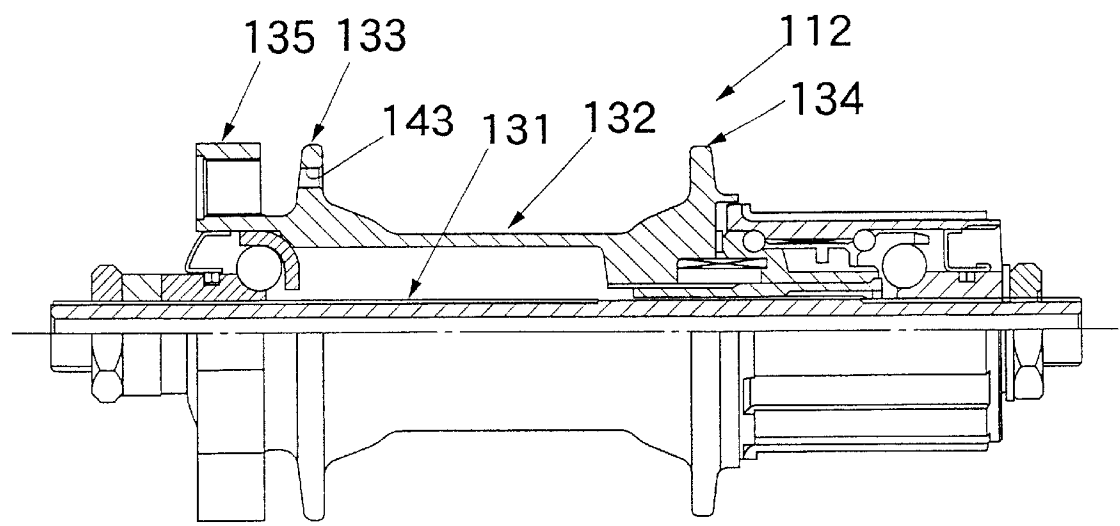
FIG. 12 is a partial longitudinal cross-sectional view of the rear disc brake hub and the rear disc brake rotor in accordance with a second embodiment of the present invention.
Figure 13:
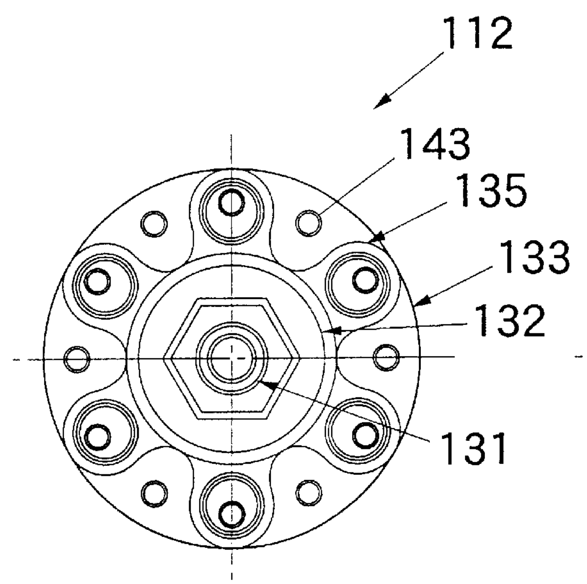
FIG. 13 is a left end elevational view of the rear disc brake hub illustrated in FIG. 12 with the disc brake rotor removed.
Figure 14:
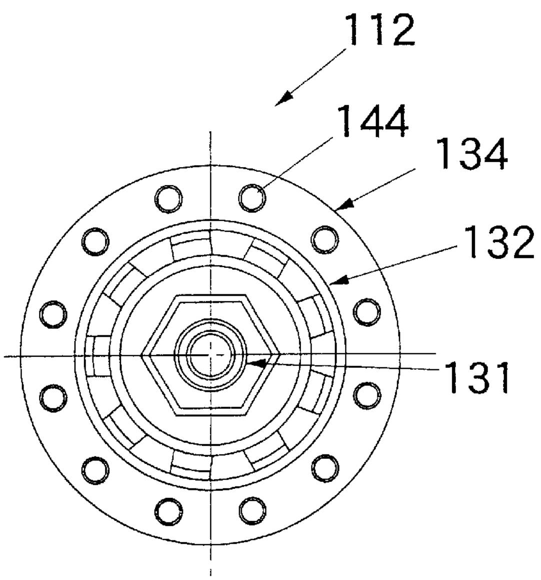
FIG. 14 is a right end elevational view of the rear disc brake hub illustrated in FIG. 12 with the disc brake rotor removed.

As seen in FIGS. 12–14, the rear disc brake hub 112 basically comprising a hub axle 131, a hub shell 132, a first spoke attachment portion 133 with a plurality of first spoke holes 143, a second spoke attachment portion 134 with a plurality of second spoke holes 144, and a brake rotor attachment portion 135. The rear hub 112 is substantially identical to the rear hub 12, except that the rear hub 112 has circularly shaped spoke holes 143 and 144 instead of spoke holes that are notched as in the first embodiment.

Figure 15:
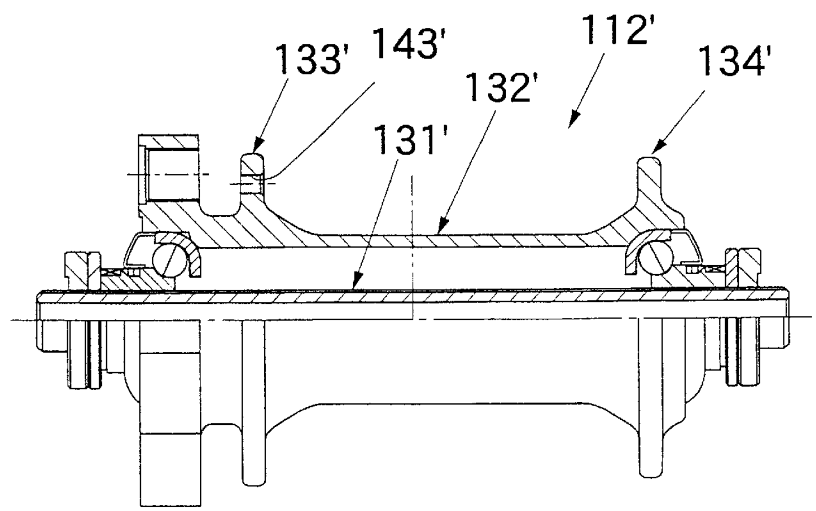
FIG. 15 is a partial longitudinal cross-sectional view of the front disc brake hub and the front disc brake rotor with the second embodiment of the present invention.
Figure 16:
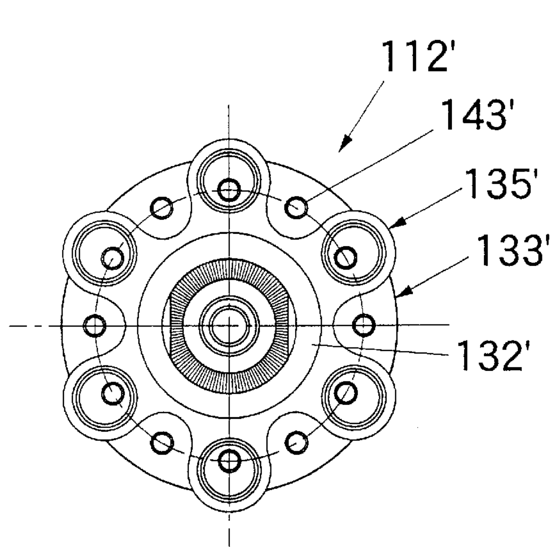
FIG. 16 is a left end elevational view of the front disc brake hub illustrated in FIG. 15 with the disc brake rotor removed.
Figure 17:
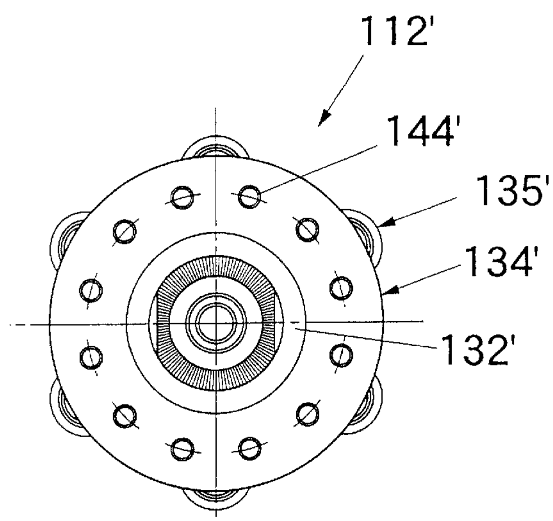
FIG. 17 is a right end elevational view of the front disc brake hub illustrated in FIG. 15 with the disc brake rotor removed.

As seen in FIGS. 15–17, the front disc brake hub 112' basically comprising a hub axle 131', a hub shell 132', a first spoke attachment portion 133' with a plurality of first spoke holes 143', a second spoke attachment portion 134' with a plurality of second spoke holes 144', and a brake rotor attachment portion 135'. The front hub 112' is substantially identical to the front hub 12', except that the front hub 112' has circularly shaped spoke holes 143' and 144' instead of spoke holes that are notched as in the first embodiment.

Third Embodiment

Referring now to FIGS. 18–23, a pair of alternate bicycle disc brake hubs 212 and 212' are illustrated in accordance with third embodiments of the present invention. These alternate bicycle disc brake hubs 212 and 212' are designed to be used with the bicycle brake rotor 223 illustrated in FIG. 24. In view of the similarity between the first and third embodiments, the descriptions of the parts of the third embodiment that are identical to the parts of the first embodiment may be omitted for the sake of brevity. Moreover, the parts of the third embodiment that have the same functions as the parts of the first embodiment will be given the same reference numerals as the parts of the first embodiment, but increased by two hundred.

Figure 18:
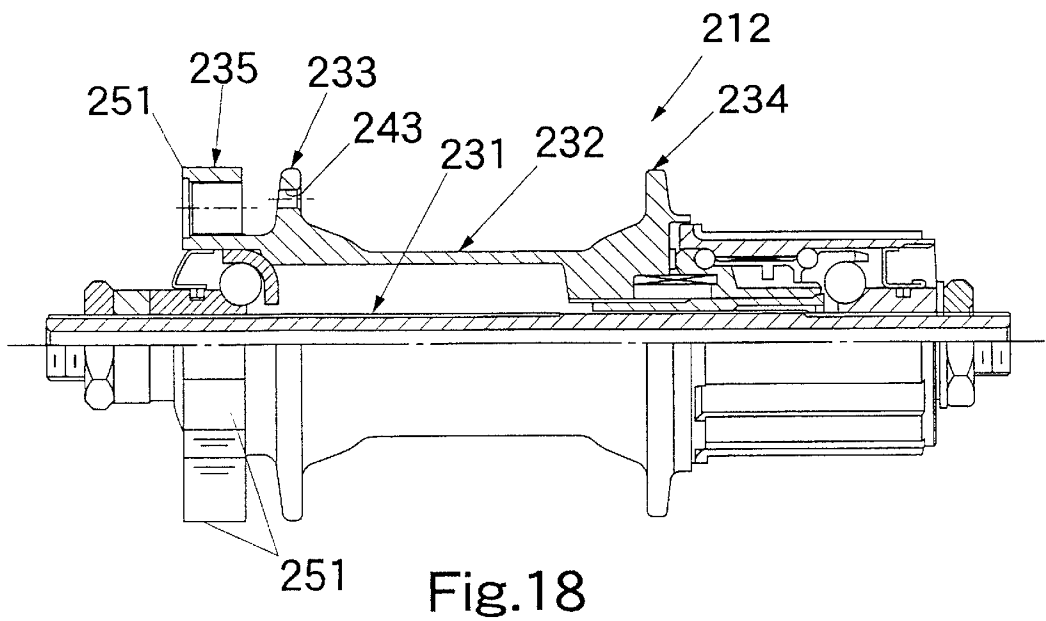
FIG. 18 is a partial longitudinal cross-sectional view of the rear disc brake hub and the rear disc brake rotor in accordance with a third embodiment of the present invention.
Figure 19:
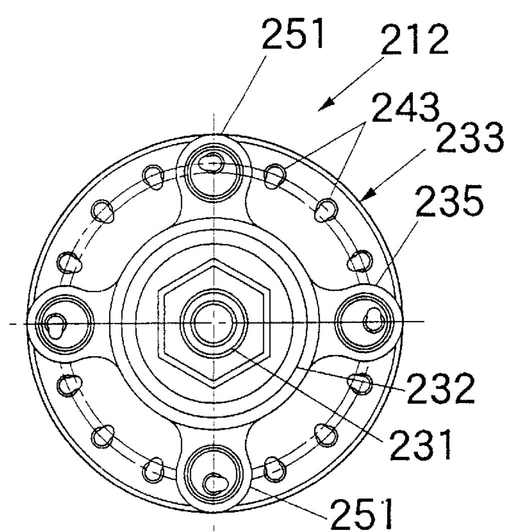
FIG. 19 is a left end elevational view of the rear disc brake hub illustrated in FIG. 18 with the disc brake rotor removed.
Figure 20:
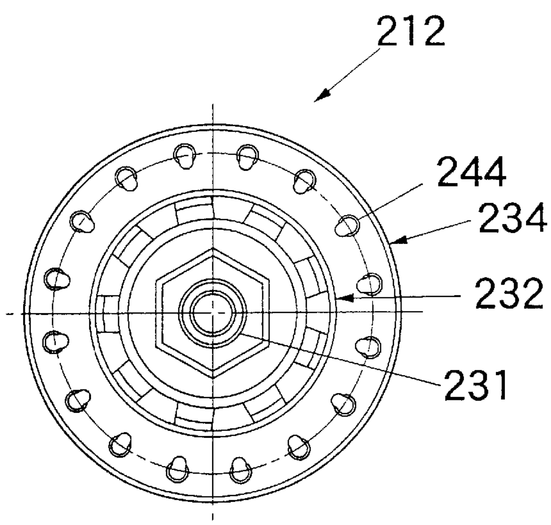
FIG. 20 is a right end elevational view of the rear disc brake hub illustrated in FIG. 18 with the disc brake rotor removed.

As best seen in FIGS. 18–20, the rear disc brake hub 212 basically comprising a hub axle 231, a hub shell 232, a first spoke attachment portion 233 with a plurality of first spoke holes 243, a second spoke attachment portion 234 with a plurality of second spoke holes 244, and a brake rotor attachment portion 235. The rear hub 212 is substantially identical to the rear hub 12, except for the configuration of the first spoke attachment portion 233 and the brake rotor attachment portion 235. Specifically, the first spoke attachment portion 233 of the rear hub 212 has sixteen circularly shaped spoke holes 243 and 244 instead of twelve spoke holes that are notched as in the first embodiment. Moreover, the brake rotor attachment portion 235 only has four mounting flanges 251 instead of six mounting flanges 251 as in the first embodiment.

As best seen in FIGS. 21–23, the front disc brake hub 212' basically comprising a hub axle 231', a hub shell 232', a first spoke attachment portion 233' with a plurality of first spoke holes 243', a second spoke attachment portion 234' with a plurality of second spoke holes 244', and a brake rotor attachment portion 235'. The front hub 212' is substantially identical to the front hub 12', except for the configuration of the first spoke attachment portion 233' and the brake rotor attachment portion 235'. Specifically, the first spoke attachment portion 233' of the front hub 212' has sixteen circularly shaped spoke holes 243' and 244' instead of twelve spoke holes that are notched as in the first embodiment. Moreover, the brake rotor attachment portion 235' only has four mounting flanges 251' instead of six mounting flanges 251' as in the first embodiment.

Figure 24:
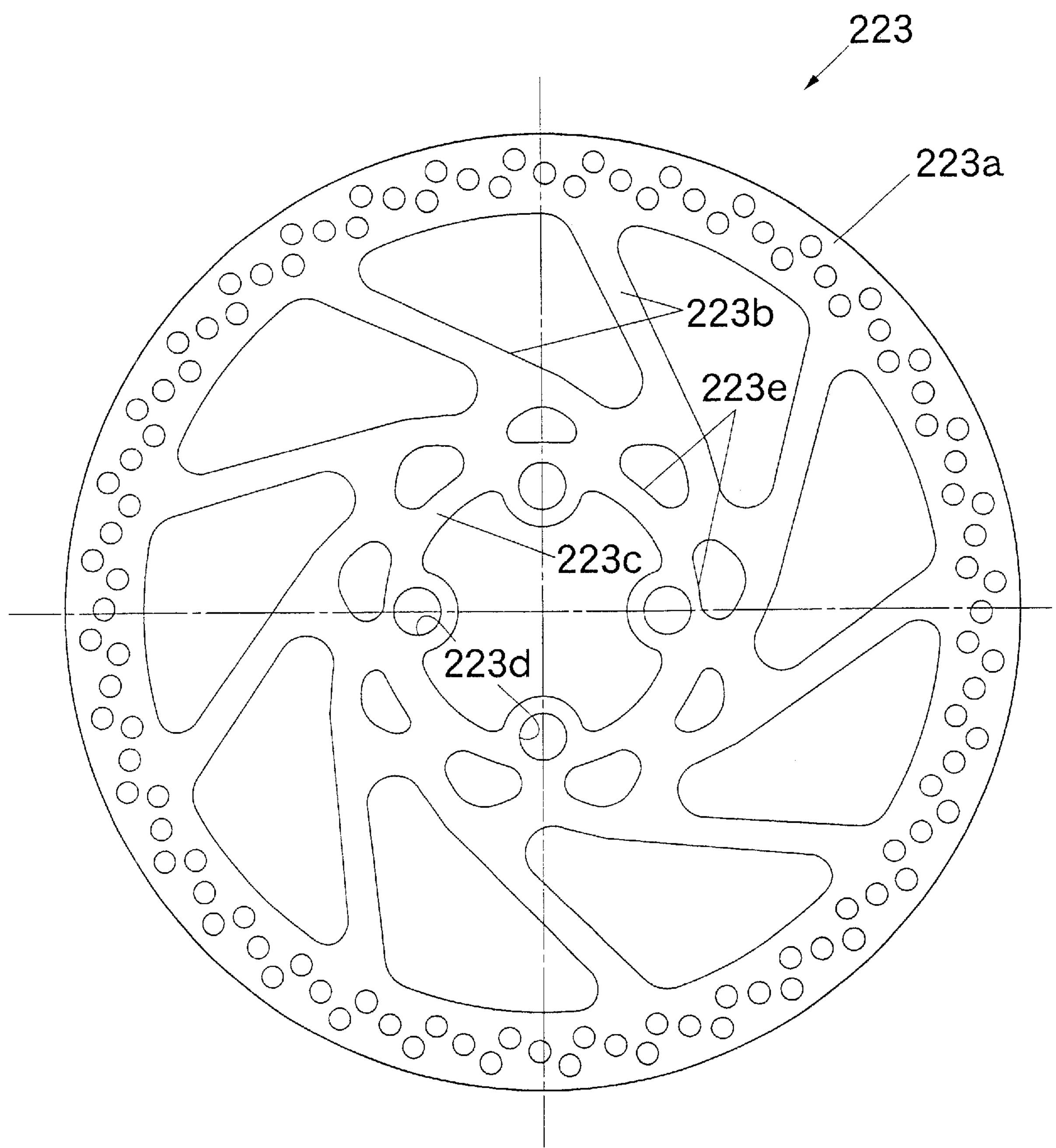
FIG. 24 is a side elevational view of the disc brake rotor used with the rear and front disc brake hubs of the third embodiment of the present invention.

Referring now to FIG. 24, the bicycle brake rotor 223 basically includes an annular braking ring **223*a*, a plurality (nine) of outwardly extending connecting arms 223*b* integrally formed with annular braking ring 223*a*, and an inner mounting portion 223*c* integrally formed with the connecting arms 223*b*. Accordingly, the bicycle brake rotor 223 is a one-piece, unitary member. Preferably, the bicycle brake rotor 223 is constructed of any suitable rigid material. The bicycle brake rotor 223 is basically identical to the bicycle brake rotor 23, except that the inner mounting portion 223*c* has four mounting axially extending attachment holes 223*d* instead of six attachment holes. The attachment holes 223*d* have diameters of at least seven millimeters, preferably diameters of eight millimeters. The attachment holes 223*d* are equally spaced about the circumference of the inner mounting portion 223*c*.**

Fourth Embodiment

Referring now to FIGS. 25–30, a pair of alternate bicycle disc brake hubs 312 and 312' are illustrated in accordance with fourth embodiments of the present invention. These alternate bicycle disc brake hubs 312 and 312' are designed to be used with the bicycle brake rotor 323 illustrated in FIG. 31. In view of the similarity between the first and fourth embodiments, the descriptions of the parts of the fourth embodiment that are identical to the parts of the first embodiment may be omitted for the sake of brevity. Moreover, the parts of the fourth embodiment that have the same functions as the parts of the first embodiment will be given the same reference numerals as the parts of the first embodiment, but increased by three hundred.

As seen in FIGS. 25–27, the rear disc brake hub 312 basically comprising a hub axle 331, a hub shell 332, a first spoke attachment portion 333 with a plurality of first spoke holes 343, a second spoke attachment portion 334 with a plurality of second spoke holes 344, and a brake rotor attachment portion 335. The rear hub 312 is substantially identical to the rear hub 12, except for the configuration of the first spoke attachment portion 333 and the brake rotor attachment portion 335. Specifically, the first spoke attachment portion 333 of the rear hub 312 has eighteen circularly shaped spoke holes 343 and 344 instead of twelve spoke holes that are notched as in the first embodiment. Moreover, the brake rotor attachment portion 335 only has three mounting flanges 351 instead of six mounting flanges 351 as in the first embodiment.

Figure 28:
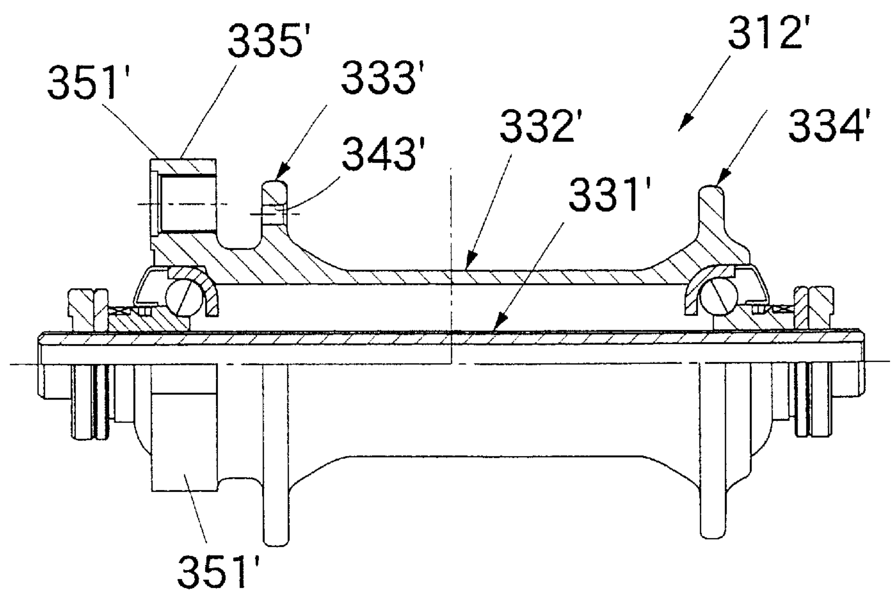
FIG. 28 is a partial longitudinal cross-sectional view of the front disc brake hub and the front disc brake rotor with the fourth embodiment of the present invention.
Figure 29:
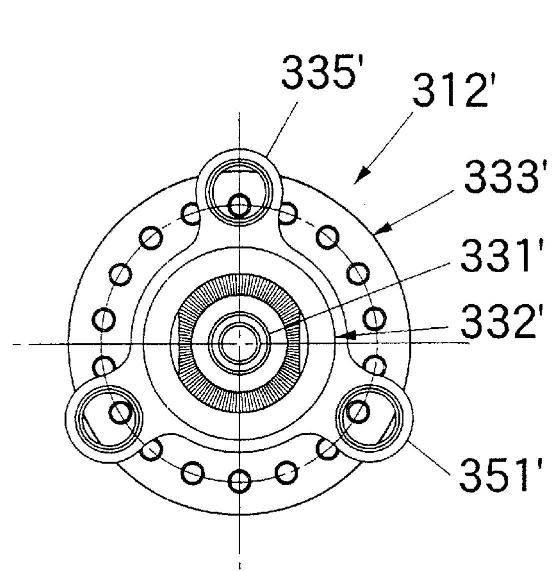
FIG. 29 is a left end elevational view of the front disc brake hub illustrated in FIG. 28 with the disc brake rotor removed.
Figure 30:
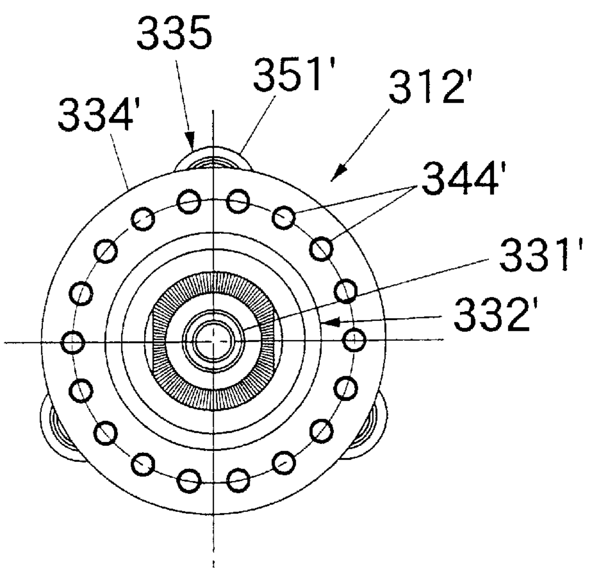
FIG. 30 is a right end elevational view of the front disc brake hub illustrated in FIG. 28 with the disc brake rotor removed.

As seen in FIGS. 28–30, the front disc brake hub 312' basically comprising a hub axle 331', a hub shell 332', a first spoke attachment portion 333' with a plurality of first spoke holes 343', a second spoke attachment portion 334' with a plurality of second spoke holes 344', and a brake rotor attachment portion 335'. The front hub 312' is substantially identical to the front hub 12', except for the configuration of the first spoke attachment portion 333' and the brake rotor attachment portion 335'. Specifically, the first spoke attachment portion 333' of the front hub 312' has eighteen circularly shaped spoke holes 343' and 344' instead of twelve spoke holes that are notched as in the first embodiment. Moreover, the brake rotor attachment portion 335' only has three mounting flanges 351' instead of six mounting flanges 351' as in the first embodiment.

Figure 31:
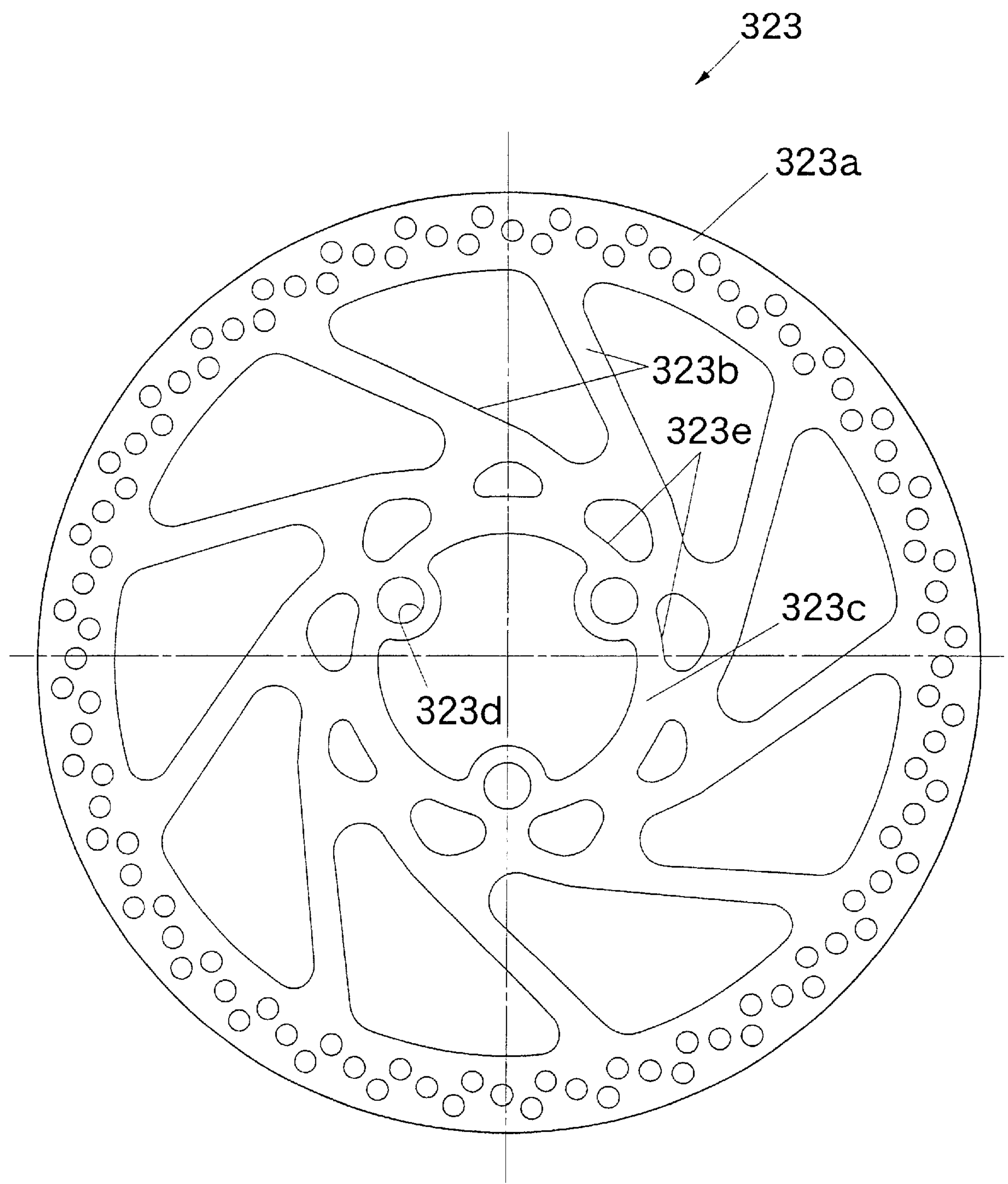
FIG. 31 is a side elevational view of the disc brake rotor used with the rear and front disc brake hubs of the fourth embodiment of the present invention.

Referring now to FIG. 31, the bicycle brake rotor 323 basically includes an annular braking ring **323*a*, a plurality (nine) of outwardly extending connecting arms 323*b* integrally formed with annular braking ring 323*a*, and an inner mounting portion 323*c* integrally formed with the connecting arms 323*b*. Accordingly, the bicycle brake rotor 323 is a one-piece, unitary member. Preferably, the bicycle brake rotor 323 is constructed of any suitable rigid material. The bicycle brake rotor 323 is basically identical to the bicycle brake rotor 23, except that the inner mounting portion 323*c* has three mounting axially extending attachment holes 323*d* instead of six attachment holes. The attachment holes 323*d* have diameters of at least seven millimeters, preferably diameters of eight millimeters. The attachment holes 323*d* are equally spaced about the circumference of the inner mounting portion 323*c*.**

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defmed in the appended claims. Furthermore, the foregoing description of the embodiments according to the present invention are provided for illustration only, and not for the purpose of limiting the invention as defined by the appended claims and their equivalents.

What is claimed is:

1. A bicycle disc brake hub comprising:

a hub axle having a center axis extending in an axial direction between a first axle end and a second axle end;

a hub shell having an interior passageway extending between first and second hub shell ends with said hub axle being rotatably supported in said interior passageway;

a first spoke attachment portion having a plurality of first spoke holes extending axially between fit and second axially facing surfaces, said first spoke holes having center axes spaced a first radial distance from said center axis of said hub axle, said first spoke attachment portion being disposed at said first hub shell end with said second axially facing surface facing towards said second hub shell end;

a second spoke attachment portion having a plurality of second spoke holes, said second spoke attachment portion being disposed at said second hub shell end; and a brake rotor attachment portion having a plurality of axially extending rotor mounting holes with predetermined diameters and center axes spaced a second radial distance from said center axis of said hub axle, said brake rotor attachment portion being disposed adjacent said first spoke attachment portion with said first axially facing surface facing towards said brake rotor attachment portion, said first spoke attachment portion and said brake rotor attachment portion being arranged relative to each other to attach spokes to said first spoke holes through said rotor mounting holes of said brake rotor attachment portion.

2. The bicycle disc brake hub according to claim 1, wherein said selected ones of said first spoke holes are individually viewable in the axial direction through corresponding ones of said rotor mounting holes.

3. The bicycle disc brake hub according to claim 2, wherein said center axes of said selected ones of said first spoke holes are offset from said center axes of said corresponding ones of said rotor mounting holes.

4. The bicycle disc brake hub according to claim 3, wherein said first radial distance of said center axes of said first spoke holes from said center axis of said hub axle is less than said second radial distance of said center axes of said rotor mounting holes from said center axis of said hub axle.

5. The bicycle disc brake hub according to claim 3, wherein said first radial distance of said center axes of said first spoke holes from said center axis of said hub axle is greater than said second radial distance of said center axes of said rotor mounting holes from said center axis of said hub axle.

6. The bicycle disc brake hub according to claim 5, wherein said second axle end has a freewheel coupled thereto.

7. The bicycle disc brake hub according to claim 6, wherein said first spoke attachment portion includes an annular spoke flange with said first spoke holes formed therein.

8. The bicycle disc brake hub according to claim 7, wherein said brake rotor attachment portion includes a plurality of circumferentially arranged mounting flanges with each of said mounting flanges having one of said rotor mounting holes formed therein.

9. The bicycle disc brake hub according to claim 8, wherein said annular spoke flange has an outer diameter that is no greater than an outer diameter formed by said mounting flanges.

10. The bicycle disc brake hub according to claim 4, wherein said first spoke attachment portion includes an annular spoke flange with said first spoke holes formed therein.

11. The bicycle disc brake hub according to claim 10, wherein said brake rotor attachment portion includes a plurality of circumferentially arranged mounting flanges with each of said mounting flanges having one of said rotor mounting holes formed therein.

12. The bicycle disc brake hub according to claim 11, wherein said annular spoke flange has an outer diameter that is less than an outer diameter formed by said mounting flanges.

13. The bicycle disc brake hub according to claim 11, wherein said annular spoke flange has an outer diameter that is no greater than an outer diameter formed by said mounting flanges.

14. The bicycle disc brake hub according to claim 1, wherein said first and second spoke attachment portions and said brake rotor attachment portion are integrally formed with said hub shell as a one-piece, unitary member.

15. The bicycle disc brake hub according to claim 1, wherein said first spoke holes are individually viewable in the axial direction from a location looking axially towards said brake rotor attachment portion and said first axially facing surface of said first spoke attachment portion.

16. The bicycle disc brake hub according to claim 1, wherein said rotor mounting holes are threaded bores.

17. The bicycle disc brake hub according to claim 16, further comprising a brake rotor having an outer braking portion, an intermediate connecting portion integrally formed with said outer braking portion, and an inner mounting portion integrally formed with said intermediate connecting portion, said inner mounting portion having a plurality of axially extending attachment holes with an inner diameter of at least seven millimeters and a plurality of bolts extending through said attachment holes and threaded in said rotor mounting holes.

18. The bicycle disc brake hub according to claim 1, further comprising a brake rotor having an outer braking portion, an intermediate connecting portion integrally formed with said outer braking portion, and an inner mounting portion integrally formed with said intermediate connecting portion, said inner mounting portion having a plurality of axially extending attachment holes with an inner diameter of at least seven millimeters and a plurality of bolts extending through said attachment holes and secured in said rotor mounting holes.

19. The bicycle disc brake hub according to claim 1, wherein said brake rotor attachment portion has six of said rotor mounting holes, and said first spoke attachment portion has twelve of said first spoke holes.

20. The bicycle disc brake hub according to claim 1, wherein said brake rotor attachment portion has four of said rotor mounting holes, and said first spoke attachment portion has sixteen of said first spoke holes.

21. The bicycle disc brake hub according to claim 1, wherein said brake rotor attachment portion has three of said rotor mounting holes, and said first spoke attachment portion has eighteen of said first spoke holes.

22. The bicycle disc brake hub according to claim 1, wherein said first spoke holes have a circular transverse cross section.

23. The bicycle disc brake hub according to claim 1, wherein said first spoke holes have a transverse cross section with a semi circular section and a notched section that extends outwardly from said semi circular section.

24. The bicycle disc brake hub according to claim 1, wherein said second axle end has a freewheel coupled thereto.

25. The bicycle disc brake hub according to claim 1, wherein said second spoke attachment portion includes an annular spoke flange with said second spoke holes extending axially therethrough.

26. A bicycle disc brake hub comprising:

a hub axle having a center axis extending in an axial direction between a first axle end and a second axle end;

a hub shell having an interior passageway extending between first and second hub shell ends with said hub axle being rotatably supported in said interior passageway;

a first spoke attachment portion having a plurality of first spoke holes extending axially between first and second axially facing surfaces, said first spoke attachment portion being disposed at said first hub shell end with said second axially facing surface facing towards said second hub shell end;

a second spoke attachment portion having a plurality of second spoke holes, said second spoke attachment portion being disposed at said second hub shell end; and a brake rotor attachment portion having a plurality of axially extending rotor mounting holes and an outer peripheral surface that lies within an imaginary circle circumscribing said outer peripheral surface, said brake rotor attachment portion being disposed adjacent said first spoke attachment portion with said first axially facing surface facing towards said brake rotor attachment portion, said first spoke holes being located radially inward of said imaginary circle circumscribing said outer peripheral surface of said brake rotor attachment portion, said first spoke attachment portion and said brake rotor attachment portion being dimensioned and oriented relative to each other to attach spokes to said first spoke holes by insertion of the spokes in said axial direction through said first axially facing surface that faces towards said brake rotor attachment portion when said brake rotor attachment portion is coupled to said hub shell.

27. A bicycle disc brake hub comprising:

a hub axle having a center axis extending in an axial direction between a first axle end and a second axle end;

a hub shell having an interior passageway extending between first avid second hub shell ends with said hub axle being rotatably supported in said interior passageway;

a first spoke attachment portion having a plurality of first spoke holes extending axially between first and second axially facing surfaces, said first spoke attachment portion being disposed at said first hub shell end with said second axially facing surface facing towards said second hub shell end;

a second spoke attachment portion having a plurality of second spoke holes, said second spoke attachment portion being disposed at said second hub shell end; and a brake rotor attachment portion having a plurality of axially extending rotor mounting holes and an outer peripheral surface that lies within an imaginary circle circumscribing said outer peripheral surface, said brake rotor attachment portion being disposed adjacent said first spoke attachment portion with said first axially facing surface facing towards said brake rotor attachment portion, said first spoke holes being located radially inward of said imaginary circle circumscribing said outer peripheral surface of said brake rotor attachment portion, selected ones of said first spoke holes being individually viewable in the axial direction through corresponding ones of said rotor mounting holes.

28. The bicycle disc brake hub according to claim 27, wherein said selected ones of said first spoke holes have center axes that are offset from center axes of said corresponding ones of said rotor mounting holes.

29. The bicycle disc brake hub according to claim 28, wherein said center axes of said first spoke holes are radially spaced from said center axis of said hub axle by a distance less than said center axes of said rotor mounting holes from said center axis of said hub axle.

30. The bicycle disc brake hub according to claim 28, wherein said center axes of said first spoke holes are radially spaced from said center axis of said hub axle by a distance greater than said center axes of said rotor mounting holes from said center axis of said hub axle.

31. The bicycle disc brake hub according to claim 30, wherein said second axle end has a freewheel coupled thereto.

32. The bicycle disc brake hub according to claim 31, wherein said first spoke attachment portion includes an annular spoke flange with said first spoke holes formed therein.

33. The bicycle disc brake hub according to claim 31, wherein said brake rotor attachment portion includes a plurality of circumferentially arranged mounting flanges with each of said mounting flanges having one of said rotor mounting holes formed therein.

34. The bicycle disc brake hub according to claim 33, wherein said first spoke attachment portion has a maximum outer diameter that is no greater than said imaginary circle circumscribing said outer peripheral surface of said brake rotor attachment portion.

35. The bicycle disc brake hub according to claim 26, wherein said first spoke attachment portion includes an annular spoke flange with said first spoke holes formed therein.

36. The bicycle disc brake hub according to claim 26, wherein said brake rotor attachment portion includes a plurality of circumferentially arranged mounting flanges with each of said mounting flanges having one of said rotor mounting holes formed therein.

37. The bicycle disc bake hub according to claim 26, wherein said first spoke attachment portion has a maximum outer diameter that is no greater than said imaginary circle circumscribing said outer peripheral surface of said brake rotor attachment portion.

38. The bicycle disc brake hub according to claim 26, wherein said first and second spoke attachment portions and said brake rotor attachment portion are integrally formed with said hub shell as a one-piece, unitary member.

39. The bicycle disc brake hub according to claim 26, wherein said rotor mounting holes are threaded bores.

40. The bicycle disc brake hub according to claim 39, further comprising a brake rotor having an outer braking portion, an intermediate connecting portion integrally formed with said outer braking portion, and an inner mounting portion integrally formed with said intermediate connecting portion, said inner mounting portion having a plurality of axially extending attachment holes with an inner diameter of at least seven millimeters and a plurality of bolts extending through said attachment holes and threaded in said rotor mounting holes.

41. The bicycle disc brake hub according to claim 26, further comprising a brake rotor having an outer braking portion, an intermediate connecting portion integrally formed with said outer braking portion, and an inner mounting portion integrally formed with said intermediate connecting portion, said inner mounting portion having a plurality of axially extending attachment holes with an inner diameter of at least seven millimeters and a plurality of bolts extending through said attachment holes and secured in said rotor mounting holes.

42. The bicycle disc brake hub according to claim 26, wherein said brake rotor attachment portion has six of said rotor mounting holes, and said first spoke attachment portion has twelve of said first spoke holes.

43. The bicycle disc brake hub according to claim 26, wherein said brake rotor attachment portion has four of said rotor mounting holes, and said first spoke attachment portion has sixteen of said first spoke holes.

44. The bicycle disc brake hub according to claim 26, wherein said brake rotor attachment portion has three of said rotor mounting holes, and said first spoke attachment portion has eighteen of said first spoke holes.

45. The bicycle disc brake hub according to claim 26, wherein said first spoke holes have a circular transverse cross section.

46. The bicycle disc brake hub according to claim 26, wherein said first spoke holes have a transverse cross section with a semi circular section and a notched section that extends outwardly from said semi circular section.

47. The bicycle disc brake hub according to claim 26, wherein said second axle end has a freewheel coupled thereto.

48. The bicycle disc brake hub according to claim 26, wherein said second spoke attachment portion includes an annular spoke flange with said second spoke holes extending axially therethrough.

49. A bicycle disc brake hub comprising:

a hub axle having a center axis extending in an axial direction between a first axle end and a second axle end;

a hub shell having an interior passageway extending between first and second hub shell ends with said hub axle being rotatably supported in said interior passageway;

a first spoke attachment portion having a plurality of first spoke holes extending axially between first and second axially facing surfaces, said first spoke attachment portion being disposed at said first hub shell end with said second axially facing surface facing towards said second hub shell end;

a second spoke attachment portion having a plurality of second spoke holes, said second spoke attachment portion being disposed at said second hub shell end; and a brake rotor attachment portion having a plurality of axially extending rotor mounting holes, said brake rotor attachment portion being disposed adjacent said first spoke attachment portion with said first axially facing surface facing towards said brake rotor attachment portion, said brake rotor attachment portion and said first spoke attachment portion having maximum outer diameters with said maximum outer diameter of said first spoke attachment portion being no greater than said maximum outer diameter of said brake rotor attachment portion, said first spoke attachment portion and said brake rotor attachment portion being dimensioned and oriented relative to each other to attach spokes to said first spoke holes by insertion of the spokes in said axial direction through said first axially facing surface that faces towards said brake rotor attachment portion, when said brake rotor attachment portion is coupled to said hub shell.

50. A bicycle disc brake hub comprising:

a hub axle having a center axis extending in an axial direction between a first axle end and a second axle end;

a hub shell having an interior passageway extending between first and second hub shell ends with said hub axle being rotatably supported in said interior passageway;

a first spoke attachment portion having a plurality of first spoke boles extending axially between first and second axially facing surfaces, said first spoke attachment portion being disposed at said first hub shell end with said second axially facing surface facing towards said second hub shell end;

a second spoke attachment portion having a plurality of second spoke holes, said second spoke attachment portion being disposed at said second hub shell end; and a brake rotor attachment portion having a plurality of axially extending rotor mounting holes, said brake rotor attachment portion being disposed adjacent said first spoke attachment portion with said first axially facing surface facing towards said brake rotor attachment portion, selected ones of said first spoke holes being individually viewable in the axial direction through corresponding ones of said rotor mounting holes, said brake rotor attachment portion and said first spoke attachment portion having maximum outer diameters with said maximum outer diameter of said first spoke attachment portion being no greater than said minimum outer diameter of said brake rotor attachment portion.

51. The bicycle disc brake hub according to claim 50, wherein said selected ones of said first spoke holes have center axes that are offset from center axes of said corresponding ones of said rotor mounting holes.

52. The bicycle disc brake hub according to claim 51, wherein said center axes of said first spoke holes are radially spaced from said center axis of said hub axle by a distance less than said center axes of said rotor mounting holes from said center axis of said hub axle.

53. The bicycle disc brake hub according to claim 51, wherein said center axes of said first spoke holes are radially spaced from said center axis of said hub axle by a distance greater than said center axes of said rotor mounting holes from said center axis of said hub axle.

54. The bicycle disc brake hub according to claim 53, wherein said second axle end has a freewheel coupled thereto.

55. The bicycle disc brake hub according to claim 54, wherein said first spoke attachment portion includes an annular spoke flange with said first spoke holes formed therein.

56. The bicycle disc brake hub according to claim 54, wherein said brake rotor attachment portion includes a plurality of circumferentially arranged mounting flanges with each of said mounting flanges having one of said rotor mounting holes formed therein.

57. The bicycle disc brake hub according to claim 56, wherein said first spoke attachment portion has a maximum outer diameter that is no greater than a maximum outer diameter formed by said mounting flanges.

58. The bicycle disc brake hub according to claim 49, wherein said first spoke attachment portion includes an annular spoke flange with said first spoke holes formed therein.

59. The bicycle disc brake hub according to claim 49, wherein said brake rotor attachment portion includes a plurality of circumferentially arranged mounting flanges with each of said mounting flanges having one of said rotor mounting holes formed therein.

60. The bicycle disc brake hub according to claim 49, wherein said first spoke attachment portion has a maximum outer diameter that is no greater than a maximum outer diameter formed by said mounting flanges.

61. The bicycle disc brake hub according to claim 49, wherein said first and second spoke attachment portions and said brake rotor attachment portion are integrally formed with said hub shell as a one-piece, unitary member.

62. The bicycle disc brake hub according to claim 49, wherein said rotor mounting holes are threaded bores.

63. The bicycle disc brake hub according to claim 62, further comprising a brake rotor having an outer braking portion, an intermediate connecting portion integrally formed with said outer braking portion, and an inner mounting portion integrally formed with said intermediate connecting portion, said inner mounting portion having a plurality of axially extending attachment holes with an inner diameter of at least seven millimeters and a plurality of bolts extending through said attachment holes and threaded in said rotor mounting holes.

64. The bicycle disc brake hub according to claim 49, further comprising a brake rotor having an outer braking portion, an intermediate connecting portion integrally formed with said outer braking portion, and an inner mounting portion integrally formed with said intermediate connecting portion, said inner mounting portion having a plurality of axially extending attachment holes with an inner diameter of at least seven millimeters and a plurality of bolts extending through said attachment holes and secured in said rotor mounting holes.

65. The bicycle disc brake hub according to claim 49, wherein said brake rotor attachment portion has six of said rotor mounting holes, and said first spoke attachment portion has twelve of said first spoke holes.

66. The bicycle disc brake hub according to claim 49, wherein said brake rotor attachment portion has four of said rotor mounting holes, and said first spoke attachment portion has sixteen of said first spoke holes.

67. The bicycle disc brake hub according to claim 49, wherein said brake rotor attachment portion has three of said rotor mounting holes, and said first spoke attachment portion has eighteen of said first spoke holes.

68. The bicycle disc brake hub according to claim 49, wherein said first spoke holes have a circular transverse cross section.

69. The bicycle disc brake hub according to claim 49, wherein said first spoke holes have a transverse cross section with a semi circular section and a notched section that extends outwardly from said semi circular section.

70. The bicycle disc brake hub according to claim 49, wherein said second axle end has a freewheel coupled thereto.

71. The bicycle disc brake hub according to claim 49, wherein said second spoke attachment portion includes an annular spoke flange with said second spoke holes extending axially therethrough.

* * * * *